(12) United States Patent
Alamuri et al.

(10) Patent No.: US 12,174,963 B1
(45) Date of Patent: *Dec. 24, 2024

(54) AUTOMATED SELECTION OF SECURE DESIGN PATTERNS

(71) Applicant: Amazon Technologies, Inc., Seattle, WA (US)

(72) Inventors: Naga Venkata Sunil Alamuri, Redmond, WA (US); Raghuveer Ketireddy, Redmond, WA (US); Trevor Tonn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

This patent is subject to a terminal disclaimer.

(21) Appl. No.: 16/174,092

(22) Filed: Oct. 29, 2018

(51) Int. Cl.
*G06F 21/57* (2013.01)
*G06F 8/20* (2018.01)
*G06F 16/901* (2019.01)

(52) U.S. Cl.
CPC .............. *G06F 21/577* (2013.01); *G06F 8/20* (2013.01); *G06F 16/9024* (2019.01); *G06F 2221/033* (2013.01)

(58) Field of Classification Search
CPC ...... G06F 21/577; G06F 16/9024; G06F 8/20; G06F 2221/033; G06F 21/50; G06F 21/00; G06F 21/12; H04L 29/06904
See application file for complete search history.

(56) References Cited

U.S. PATENT DOCUMENTS

| | | | |
|---|---|---|---|
| 7,818,788 | B2 | 10/2010 | Meier |
| 7,891,003 | B2 | 2/2011 | Mir et al. |
| 8,272,061 | B1 | 9/2012 | Lotem et al. |
| 8,490,192 | B2 | 7/2013 | Dai et al. |
| 8,516,575 | B2 | 8/2013 | Burnside et al. |
| 8,732,838 | B2 | 5/2014 | Medvedev et al. |

(Continued)

OTHER PUBLICATIONS

Kong et al. (UML-Based Modeling and Analysis of Security Threats, International Journal of Software Engineering and Knowledge Engineering vol. 20, No. 6 (2010) 875-897) (Year: 2010).*

(Continued)

*Primary Examiner* — Oleg Korsak
(74) *Attorney, Agent, or Firm* — Robert C. Kowert; Kowert, Hood, Munyon, Rankin & Goetzel. P.C.

(57) ABSTRACT

Methods, systems, and computer-readable media for automated selection of secure design patterns are disclosed. One or more graphs comprising a plurality of nodes and a plurality of edges are generated. At least a portion of the nodes represent software components and at least a portion of the edges represent relationships, and the one or more graphs comprise a plurality of sub-graphs. Using a graph analysis engine, the sub-graphs are analyzed for compliance with one or more security policies. A particular sub-graph is selected based at least in part on respective policy compliance of the sub-graphs. A design template is determined based at least in part on one or more software components in the particular sub-graph. The design template comprises a configuration compliant with the one or more security policies and is provided in a development environment.

20 Claims, 16 Drawing Sheets

(56) References Cited

U.S. PATENT DOCUMENTS

| | | | |
|---|---|---|---|
| 8,856,725 B1* | 10/2014 | Anderson | G06F 8/75 717/103 |
| 8,904,353 B1* | 12/2014 | Arguelles | G06F 11/3672 717/124 |
| 9,171,167 B2 | 10/2015 | Ayyagari et al. | |
| 9,195,833 B2* | 11/2015 | Chestna | G06F 8/30 |
| 9,210,185 B1 | 12/2015 | Pinney Wood et al. | |
| 9,575,979 B1* | 2/2017 | Mcclintock | G06F 16/152 |
| 9,665,721 B2 | 5/2017 | Artes et al. | |
| 9,712,551 B2 | 7/2017 | Grubel et al. | |
| 9,736,182 B1 | 8/2017 | Madhukar et al. | |
| 9,954,879 B1 | 8/2018 | Sadaghiani et al. | |
| 10,084,804 B2 | 9/2018 | Kapadia et al. | |
| 10,466,990 B1* | 11/2019 | McCluskey | G06F 9/45558 |
| 10,540,502 B1* | 1/2020 | Joyce | G06F 21/552 |
| 10,680,895 B1* | 6/2020 | McCluskey | G06Q 40/02 |
| 10,860,295 B1 | 12/2020 | Ketireddy et al. | |
| 11,531,763 B1* | 12/2022 | Gupta | G06F 21/577 |
| 11,770,398 B1* | 9/2023 | Erlingsson | G06F 16/3329 709/224 |
| 11,818,156 B1* | 11/2023 | Parikh | G06F 16/9537 |
| 2003/0233631 A1* | 12/2003 | Curry | G06F 8/20 717/100 |
| 2006/0111880 A1* | 5/2006 | Brown | G06F 8/20 703/1 |
| 2006/0168557 A1* | 7/2006 | Agrawal | G06F 8/36 717/104 |
| 2006/0173893 A1* | 8/2006 | Kristoffersen | G06Q 10/10 |
| 2006/0173894 A1* | 8/2006 | Kristoffersen | G06Q 10/10 |
| 2007/0067844 A1 | 3/2007 | Williamson | |
| 2007/0162890 A1* | 7/2007 | Meier | G06F 21/577 717/100 |
| 2007/0209074 A1* | 9/2007 | Coffman | G06F 21/552 709/224 |
| 2007/0240138 A1* | 10/2007 | Chess | G06F 11/3612 717/143 |
| 2007/0265814 A1* | 11/2007 | Moore | G06F 8/36 703/10 |
| 2007/0294766 A1* | 12/2007 | Mir | G06Q 10/06 726/23 |
| 2008/0097630 A1* | 4/2008 | Weatherhead | G05B 19/0426 700/86 |
| 2008/0256390 A1* | 10/2008 | Chaar | G06F 8/20 714/27 |
| 2009/0077666 A1* | 3/2009 | Chen | G06Q 10/0631 726/25 |
| 2009/0183061 A1* | 7/2009 | Beneditto | G06F 21/554 715/212 |
| 2009/0328223 A1* | 12/2009 | Medvedev | G06F 21/577 726/25 |
| 2011/0093955 A1* | 4/2011 | Chen | G06F 21/577 726/25 |
| 2011/0107303 A1* | 5/2011 | Huang | G06F 8/71 717/123 |
| 2011/0246961 A1* | 10/2011 | Tripathi | G06F 8/36 717/105 |
| 2012/0317541 A1* | 12/2012 | Kaulgud | G06F 8/77 717/102 |
| 2014/0090070 A1* | 3/2014 | Tripp | G06F 21/577 726/25 |
| 2014/0101769 A1* | 4/2014 | Tripp | G06F 16/9024 726/25 |
| 2014/0237443 A1* | 8/2014 | Pana | G06F 8/38 717/105 |
| 2015/0143524 A1* | 5/2015 | Chestna | G06F 11/36 726/25 |
| 2015/0244734 A1 | 8/2015 | Olson et al. | |
| 2015/0309813 A1* | 10/2015 | Patel | G06F 8/75 703/22 |
| 2016/0196136 A1* | 7/2016 | Thippavajjula | G06F 11/3688 717/101 |
| 2016/0239272 A1* | 8/2016 | Petri | G06F 8/20 |
| 2016/0248798 A1* | 8/2016 | Cabrera | H04L 63/1425 |
| 2016/0275292 A1* | 9/2016 | Chestna | G06F 11/36 |
| 2017/0063891 A1 | 3/2017 | Muddu | |
| 2017/0337293 A1* | 11/2017 | Farkash | G06F 16/254 |
| 2018/0060468 A1* | 3/2018 | Morgan | G06F 30/20 |
| 2018/0219888 A1* | 8/2018 | Apostolopoulos | H04L 63/1425 |
| 2018/0262516 A1 | 9/2018 | Zomlot et al. | |
| 2018/0337939 A1* | 11/2018 | Agarwal | H04L 63/20 |
| 2019/0050319 A1* | 2/2019 | Gondalia | G06F 11/3664 |
| 2019/0065606 A1* | 2/2019 | Jiang | G06F 7/026 |
| 2019/0138731 A1* | 5/2019 | Tan | G06F 11/3608 |
| 2019/0278760 A1* | 9/2019 | Smart | G06F 16/2264 |
| 2019/0347422 A1* | 11/2019 | Abadi | G06F 16/9024 |
| 2022/0247769 A1* | 8/2022 | Erlingsson | H04L 67/535 |
| 2023/0370334 A1* | 11/2023 | Mannengal | H04L 43/04 |
| 2023/0370452 A1* | 11/2023 | Mannengal | H04L 63/20 |

OTHER PUBLICATIONS

Darren Pauli, "Mozilla project spits out threat modelling tool for sysadmins," Apr. 2015, theRegister.co.uk. Source: https://www.theregister.co.uk/2015/04/01/mozilla_project_spits_out_sys_admin_threat_modelling_tool/, pp. 1-5.

U.S. Appl. No. 15/996,361, filed Jun. 1, 2018, Raghuveer Ketireddy et al.

* cited by examiner

AUTOMATED SELECTION OF SECURE DESIGN PATTERNS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many applications and services that interact with one another in varied ways. For example, a web server may receive requests for web pages and use a complex set of interrelated services to build those requested pages.

Figure 1A:
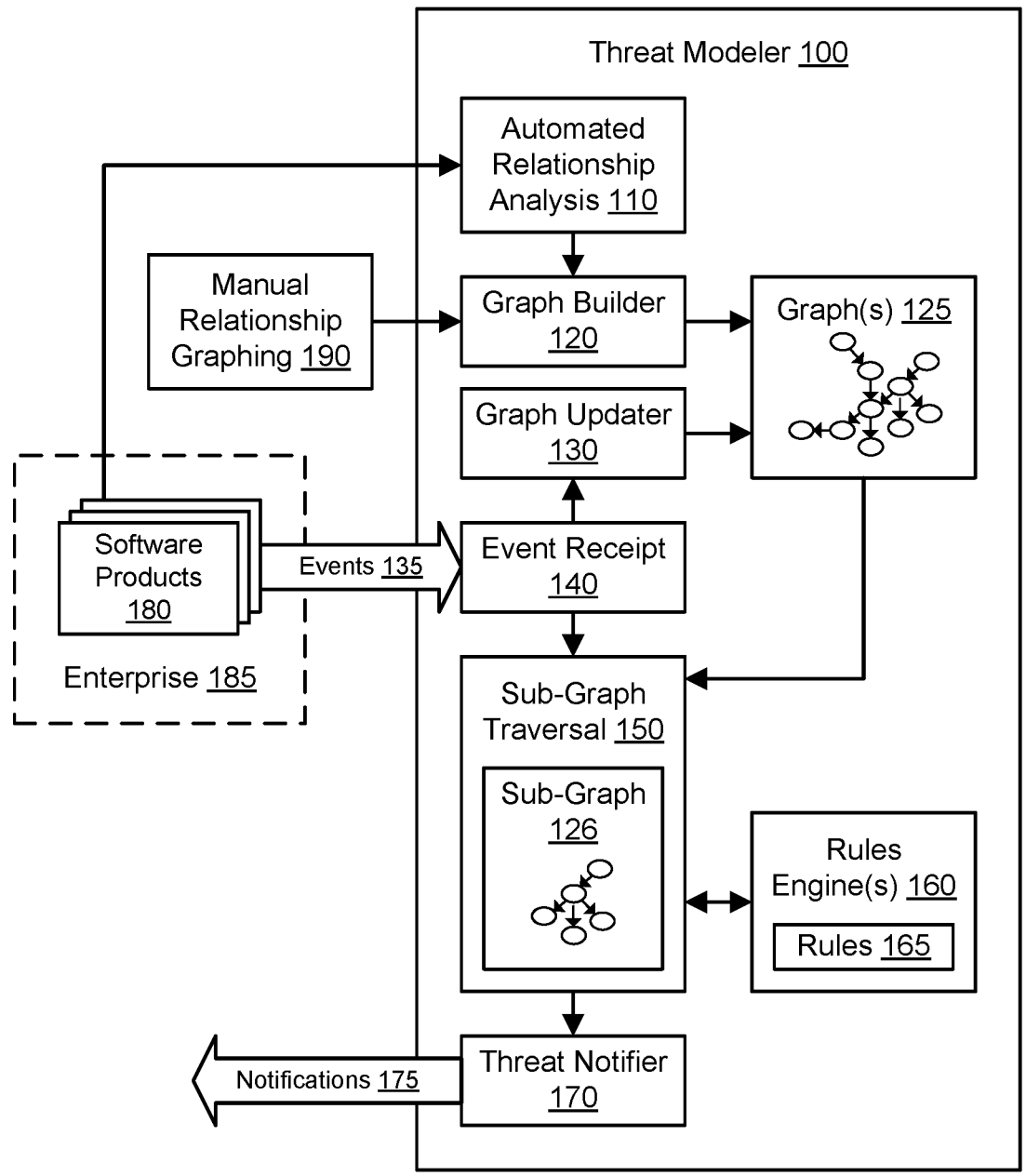
FIG. 1A and FIG. 1B illustrate an example system environment for automated threat modeling using application relationships, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated selection of secure design patterns are described. Using automated techniques, software products may be analyzed to select secure or policy-compliant design patterns. Secure or policy-compliant design templates may then be built automatically based (at least in part) on the selected design patterns. The design patterns and resulting design templates may belong to different categories of functionality such as web applications, RESTful services, payment systems, user authentication, storage of secure data, and so on. When a developer seeks to build a new application in one of the categories of functionality, a design pattern selected in that category may be provided in a development environment, via a corresponding design template, to ensure the security or policy compliance of the new application. In one embodiment, a code template for the new application may also be generated using automated techniques. To select the design patterns, the components of the software products and the relationships between components may be represented in one or more graphs, and sub-graphs may be traversed and analyzed using one or more rules engines or analyzers. One or more sub-graphs may correspond to a particular design pattern of components, their relationships, and their configurations. The sub-graphs or design patterns may be assigned scores that reflect their security, compliance with policies, and/or performance (including availability). The sub-graphs or design patterns may also be assigned to the different categories of functionality. In one embodiment, the sub-graph or design pattern with the best score in a particular category of functionality may be selected as the basis for an automatically generated design template. In various embodiments, a sub-graph or design pattern may be selected based (at least in part) on the length of the sub-graph, the number of unmitigated security threats in the sub-graph, the frequency of the design pattern in a particular category, the performance of the corresponding software products, and so on. Using the techniques described herein for automated threat modeling, graph analysis, and template building, the security or policy compliance of software development may be enhanced.

Using prior approaches for threat modeling, an application was often subjected to manual security review by experts or other humans, typically early in the application's lifecycle. For example, a user-drafted architecture document may have been manually reviewed by a security expert to determine security vulnerabilities. Similarly, design templates and code templates for new software products may have been built manually. However, such manual techniques are prone to error. For example, the actual implementation may diverge from the design documents on which the manual review is based, or the documents themselves may be incomplete or incorrect. As another example, design templates and code templates may become outdated as new threats emerge or new policies become relevant. Additionally, such manual techniques demand users' time and accordingly may not be performed sufficiently often. For example, if a deployed application's code is changed or the application is reconfigured at a later stage of its lifecycle, a security expert may not subject the application to further manual review. The automated selection of secure design patterns as described herein may address and mitigate such flaws.

As one skilled in the art will appreciate in light of this disclosure, embodiments may be capable of achieving certain technical advantages, including some or all of the following: (1) improving the security of software products by using automated selection of secure design patterns that reduces or eliminates human error in assessing security threats; (2) improving the policy compliance of software products by using automated selection of secure design patterns that reduces or eliminates human error in assessing policy compliance; (3) improving the performance or availability of software products by using automated selection of secure design patterns using performance metrics; (4) reducing demands on user time by performing threat modeling and template building using automated processes; (5) reducing the latency of addressing new threats by performing automated selection of secure design patterns repeatedly over time; and so on.

Automated Threat Modeling Using Application Relationships

Figure 1B:
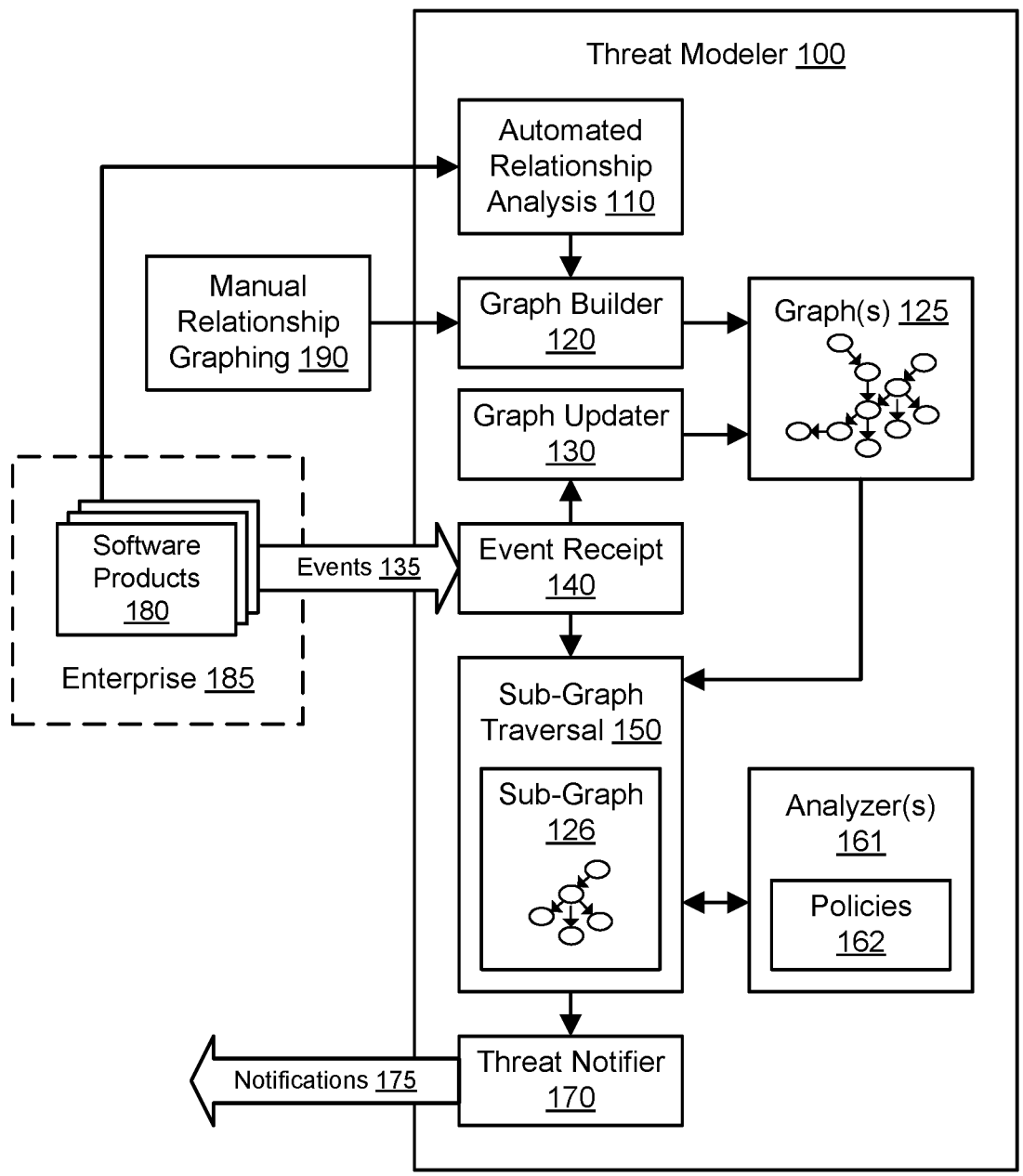

FIG. 1A and FIG. 1B illustrate an example system environment for automated threat modeling using application relationships, according to some embodiments. A threat modeler 100 may use automated techniques to perform threat modeling for software products 180. Software products 180 may include executable program code such as applications, services, components of applications, components of services, and so on. The terms "application" and "service" may be used interchangeably herein. Components of software products 180 may include executable programs (e.g., applications, services, packages, and so on), configurations of programs, storage resources (e.g., as managed by network-accessible storage services), configurations of storage resources, database tables, execution environments, hosts or other computing devices, network devices (e.g., routers and load balancers), network entities (e.g., virtual private clouds), abstractions such as host classes, containers, tasks submitted to program execution services, other network-accessible services, and so on. In one embodiment, automated threat modeling may attempt to determine whether software products 180 comply with applicable policies. The policies may be security-related, and automated threat modeling by the threat modeler 100 may thus attempt to determine whether security threats, vulnerabilities, or other security-related flaws are present in software products 180. The policies may also relate to best practices for software development, for identifying availability concerns, for identifying privacy concerns, and so on. In various embodiments, the threat modeler may include various components such as a component for automated relationship analysis 110, a graph builder 120, a graph updater 130, a component for event receipt 140, a component for sub-graph traversal 150, one or more rules engines 160, and/or a threat notifier 170. These components and their operations are discussed as follows.

Using the graph builder 120, one or more graphs 125 may be generated. The graph(s) 125 may include a plurality of nodes representing software components and a plurality of edges representing relationships between software components. In one embodiment, each of many graphs 125 may represent components of a particular application, and sub-graphs within a graph may represent different functionalities of the application. The edges may include directed edges. In one embodiment, the graph(s) 125 may include directed acyclic graphs. The relationships may include relationships between components of a single application and/or relationships from one application to another application. For example, two connected nodes may represent an application and a storage object in a storage service, and the edge between the nodes may represent that the application stores data in that storage object. The graph(s) may capture a complex web of intra-application and inter-application relationships in an enterprise 185, such that different portions of the graph(s) (sub-graphs) may represent different applications or services. For a sufficiently large enterprise 185, an enterprise-wide graph 125 may include vast numbers of nodes. In one embodiment, some portions of the graph(s) 125 may be unconnected to (and unreachable by) other portions of the graph(s). The graph(s) 125 may represent a machine-consumable model of software products 180, their components, and the relationships between products and components.

In one embodiment, the graph(s) may be built using automated relationship analysis 110, e.g., using properties of the software products 180 themselves as input. For example, the automated relationship analysis 110 may include static code analysis, dynamic (runtime) analysis, and/or metadata acquisition. Static code analysis may include analysis of program code of applications and their components, e.g., to determine intra-application and inter-application relationships reflected in the program code. Runtime analysis may include call tracing among instances of applications and their components, e.g., to determine intra-application and inter-application relationships reflected in real-world service calls. In one embodiment, the graph(s) may be built by using one or more ETL (Extract, Transform, Load) tools to extract relevant metadata from services or subsystems associated with the software products 180 and then using that extracted metadata to generate particular elements of the graph. For example, a software deployment system may link code packages to computing devices where the packages are intended to run; metadata capturing such relationships may be acquired and used to generate an edge between a code package and a device in the graph(s) 125. The ETL tools may vary across different services or subsystems of the enterprise 185, such as different package management systems, database services, network-accessible or "cloud-based" storage services, application environments, containerization systems, and so on.

In one embodiment, the graph(s) may be built initially based on user input, e.g., as captured using one or more tools for manual relationship graphing 190. For example, the graphing tool(s) 190 may permit developers to manually draw relationships between components of a software product in a graphical user interface. However, such user input may be incorrect or inaccurate or may become outdated at some point during the lifecycle of the software product. In one embodiment, to reduce or even eliminate such human error, the user-supplied initial graph may be modified, corrected, and/or augmented using the automated relationship analysis 110. In one embodiment, the user tool(s) 190 for describing application architectures and the tool for automated relationship analysis 110 may use a similar or identical set of terms for application types, relationship types, datatypes, and so on, in order to facilitate the use of the user-supplied information for automated graph building. In one embodiment, all or part of the graph(s) 125 may be vended back to the graphing tool(s) 190 for visualization to users and/or to solicit further user input regarding the graph.

In one embodiment, the graph(s) 125 may include metadata for individual nodes and edges, and the metadata may indicate unique node identifiers, unique edge identifiers, node types, edge types, and so on. Using such metadata, each node and/or edge may be uniquely identified in the graph(s) 125. In one embodiment, additional metadata may be stored outside of the graph(s) 125, e.g., in a storage service at a location or key associated with a node or edge in a graph itself. For example, contact information for an owner of a node may be stored external to the graph(s) 125, e.g., in a database or storage service, and such information may be retrievable using a key or other identifier stored within the graph.

Using the event receipt component 140, events 135 may be received over time. Receipt of an event may trigger the updating of the graph(s) 125. Receipt of an event may trigger automated threat analysis for a portion of the graph(s) 125. An event may be indicative of a change to one or more of the nodes or edges in the graph. For example, the event may describe a change to the program code of a software component. As another example, the event may describe a change to the configuration of a software component. As yet another example, the event may describe a change to a relationship between two software components. Events may be generated by elements of the enterprise 185, such as software development environments in which program code is managed or ETL tools associated with various subsystems or services of the enterprise. An event may include data such as identifiers of one or more affected software components or relationships that correspond to nodes or edges in the graph. The threat modeler 100 may subscribe to events for changed software products and new rules, e.g., via an event streaming service. Events may be received repeatedly and at different times after the graph(s) 125 are built. Events may be received throughout the lifecycle of a particular software product, e.g., when the software is designed, implemented, tested, deployed, updated with minor updates, updated with major updates, and so on. By triggering the automated threat analysis on such events, a particular software product may undergo a security review again and again as the product or its relationships change.

Using the graph updater 130, the graph(s) 125 may be modified based (at least in part) on an event. The affected nodes or edges may be identified by comparing the graph metadata (e.g., the unique identifiers of nodes and edges) to the information in the event. In modifying the graph(s) 125, the graph updater 130 may add one or more nodes, add one or more edges, remove one or more nodes, remove one or more edges, modify the metadata for one or more nodes, modify the metadata for one or more edges, and/or update the graph(s) in any other suitable manner. For example, if the event indicates that the program code has been updated to store data having a particular datatype in a particular location in a storage service, the threat modeler may add a node for that storage service (with metadata indicating the particular location) and a directed edge connecting the software product to the storage service. As another example, the graph metadata for the updated portion of the graph(s) may be modified to indicate the datatypes of source data and/or destination data for a new relationship. In one embodiment, the graph(s) 125 may be updated by using one or more ETL (Extract, Transform, Load) tools to extract relevant data from a service or subsystem associated with the affected node(s) and then using that extracted data to modify particular elements of the graph(s).

As discussed above, the graph(s) may capture a complex web of intra-application and inter-application relationships in an enterprise, such that different portions of the graph(s) (sub-graphs) may represent different applications or services. Using the component for sub-graph traversal 150, a sub-graph 126 associated with an event may be identified in the graph(s) 125. In one embodiment, the sub-graph 126 may include a plurality of nodes rooted at one or more nodes associated with a software product affected by the event. For example, if a component of an application is updated with new program code, then a sub-graph of other components that are dependent on the updated component may be identified. As another example, if an access policy on a storage object is changed, then the sub-graph may include nodes associated with that storage object.

Using the component for sub-graph traversal 150, threat modeling may be performed on the sub-graph 126. In one embodiment, as shown in FIG. 1A, the threat modeling may be performed using one or more rules engines 160. A rules engine may apply one or more rules 165 to metadata associated with nodes and edges of the sub-graph 126 to determine whether security threats or vulnerabilities are present in those nodes or edges. In one embodiment, as shown in FIG. 1B, the threat modeling may be performed using one or more analyzers 161. Using metadata associated with nodes and edges of the sub-graph 126, an analyzer may determine whether the sub-graph is in compliance with one or more policies 162. In one embodiment, the analyzer(s) 161 may include one or more rules engines. To perform this threat modeling, the sub-graph may be traversed from one or more root nodes in a process termed micro-traversal. The extent of the micro-traversal (e.g., the point at which the traversal ends) may be determined by the requirements of particular rules or policies. The entire graph 125 for an enterprise 185 may be large and complex, and the use of micro-traversal of a sub-graph 126 may permit the threat modeling to be performed efficiently and in a focused manner. In one embodiment, the sub-graph traversal 150 may implement generational graph traversal in which interested consumers (e.g., rules engines or analyzers) minimize graph operations (e.g., obtaining edges for a vertex or obtaining paths from one vertex to another vertex) by piggybacking on a single graph operation and exposing the results to a set of consumers.

The rules 165 for the rules engine(s) 160 may be written by developers to detect particular security threats. The policies 162 may be developed by users to determine whether software products are in compliance with best practices, e.g., to protect against security threats and vulnerabilities. In one embodiment, a main rules engine or analyzer may be used for common threats, and additional rules engines or analyzers may be added to detect new threats, uncommon threats, and/or threats requiring more complex analysis. In applying a rule to a sub-graph, metadata about nodes and edges may be extracted from the graph(s) and used to determine whether the rule matches any portion of the sub-graph. The metadata may describe properties such as authentication properties, authorization properties, access control properties, datatype properties, and so on. Micro-traversals to apply rules or policies to sub-graphs may automate data-gathering and decision-making operations such as determining what a component does, determining what kind of data the component has, determining where the data is sent or stored, determining what protections are on the handling of the data, determining who has access to the hosts where code or data is located, and so on.

For a given sub-graph and a given rule, the sub-graph traversal 150 may determine whether or not a security threat or vulnerability is present in a software product or software component. A particular rule may dictate whether a threat or vulnerability is present based (at least in part) on the elements of the rule as applied to the metadata associated with nodes and edges of the sub-graph. For example, if a node in the sub-graph acquires sensitive data such as user payment information and then stores that information in an insecure manner (e.g., as plaintext in a storage service bucket), then an applicable rule may determine that the node represents a security threat. Similarly, the sub-graph traversal 150 may dictate whether component(s) of the sub-graph 126 are in compliance with a particular policy, e.g., based (at least in part) on the elements of the policy as applied to the metadata associated with nodes and edges of the sub-graph.

A threat notifier 170 may generate and send notifications 175 of security threats that are identified using the automated threat modeling. Using the threat notifier 170, if a threat is found, then an owner or manager associated with the affected node may be notified about the threat. Contact information for the owner or manager (e.g., an e-mail address or messaging address) may be extracted from the node itself or from metadata associated with the node and stored outside the graph, and a notification may be generated and sent to that contact address. In one embodiment, a notification may be provided to a subsystem that implements the affected node(s) or a management console associated with the affected node(s). In some embodiments, the content of a notification may vary based (at least in part) on the rule that was violated. A notification may indicate data such as a name or identifier of the insecure node or relationship, a name or description of the rule that was violated, a datatype that was handled insecurely, a description of the event that triggered the automated threat modeling, a timestamp of the event, a timestamp of the threat modeling, a classification of the risk level (e.g., high, medium, or low), and/or other suitable data usable by the owner or manager to mitigate the security threat. Mitigation of a security threat may include modifying the program code of a software product, modifying the configuration of a software product, modifying a relationship between two components, and so on.

In one embodiment, the threat notifier 170 may send notifications 175 to one or more automated processes. The automated processes may in turn send metadata to additional automated processes, and so on, for additional analysis. Ultimately a user may be notified as discussed above. In this manner, a pipeline of processes may collaborate to create a holistic view of problems in the enterprise 185 and provide more details to users.

Figure 2:
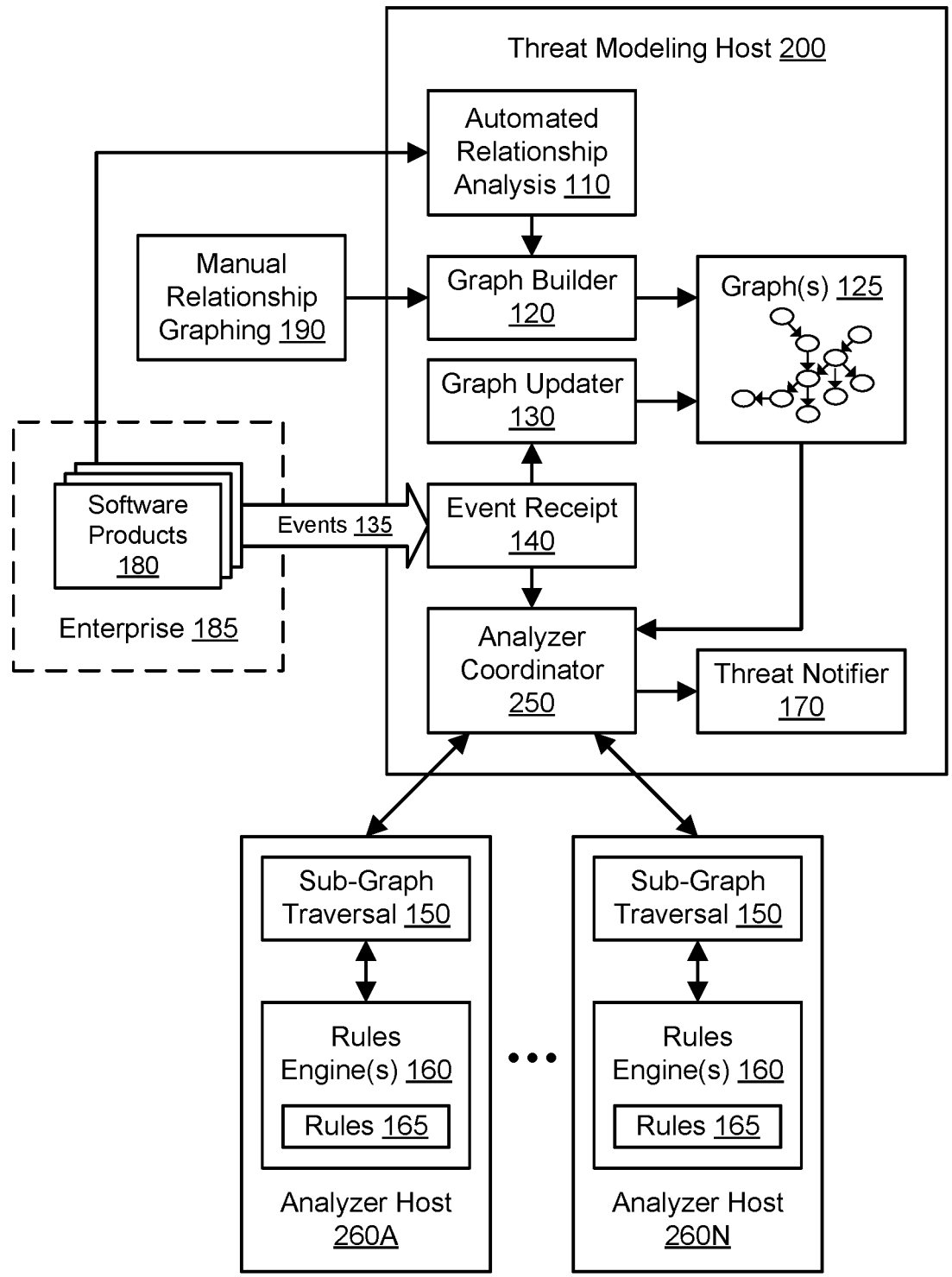
FIG. 2 illustrates further aspects of the example system environment for automated threat modeling using application relationships, including the use of a fleet of hosts to perform sub-graph traversal using one or more rules engines, according to one embodiment.

FIG. 2 illustrates further aspects of the example system environment for automated threat modeling using application relationships, including the use of a fleet of hosts to perform sub-graph traversal using one or more rules engines, according to one embodiment. In one embodiment, one or more threat modeling hosts such as host 200 may implement aspects of the threat modeler 100. For example, threat modeling host 200 may implement the automated relationship analysis 110, graph builder 120, graph updater 130, event receipt 140, and threat notifier 170. In one embodiment, a fleet of analyzer hosts 260A-260N may implement sub-graph traversal 150 using the rules engine(s) 160 or analyzer(s) 161. Although analyzer hosts 260A through 260N are shown for purposes of illustration and example, it is contemplated that any suitable number and configuration of analyzer hosts may be used. In one embodiment, the various analyzer hosts 260A-260N may employ the same one or more rules engines 160 and the same rules 165 across the fleet of hosts. In one embodiment, the various analyzer hosts 260A-260N may employ different rules engines or rules across the fleet of hosts. In some embodiments, the analyzer hosts 260A-260N may employ analyzers 161 other than rules engines, e.g., to determine policy compliance of software products.

The threat modeling host 200 may include an analyzer coordinator 250 that coordinates the analyzer hosts 260A-260N. In one embodiment, the analyzer coordinator 250 may send commands to individual analyzer hosts in order to cause the individual hosts to perform sub-graph traversal for particular sub-graphs. In one embodiment, the analyzer coordinator 250 may then receive results of the sub-graph traversal from the individual analyzer hosts. The result of sub-graph traversal for a particular sub-graph and rule may indicate data such as whether a rule was matched in the sub-graph, the name and/or description of any rule that was matched, the component(s) affected by the matched rule, and any other information usable to mitigate threats that are identified. The result of sub-graph traversal for a particular sub-graph and policy may indicate data such as whether a policy was violated in the sub-graph, the name and/or description of any policy that was violated, the component(s) affected by the violated policy, and any other information usable to mitigate threats that are identified.

In one embodiment, the analyzer coordinator 250 may select or modify the number of analyzer hosts 260A-260N to meet the current processing needs of the threat modeling process. For example, the analyzer coordinator 250 may scale up the number of analyzer hosts as more events are received or scale down the number of analyzer hosts as fewer events are received. As another example, the analyzer coordinator 250 may scale up the number of analyzer hosts as host metrics exceed a performance or usage threshold or scale down the number of analyzer hosts as host usage metrics drop below a performance or usage threshold. In one embodiment, the analyzer coordinator 250 may interact with a resource manager of a provider network in order to select, provision, configure, and/or deprovision hosts. For example, the resource manager may respond to a request from the analyzer coordinator 250 by reserving a particular set of hosts from a pool of available hosts. Similarly, the resource manager may deprovision and return surplus hosts to the pool of available hosts, e.g., for use by other services.

Figure 11:
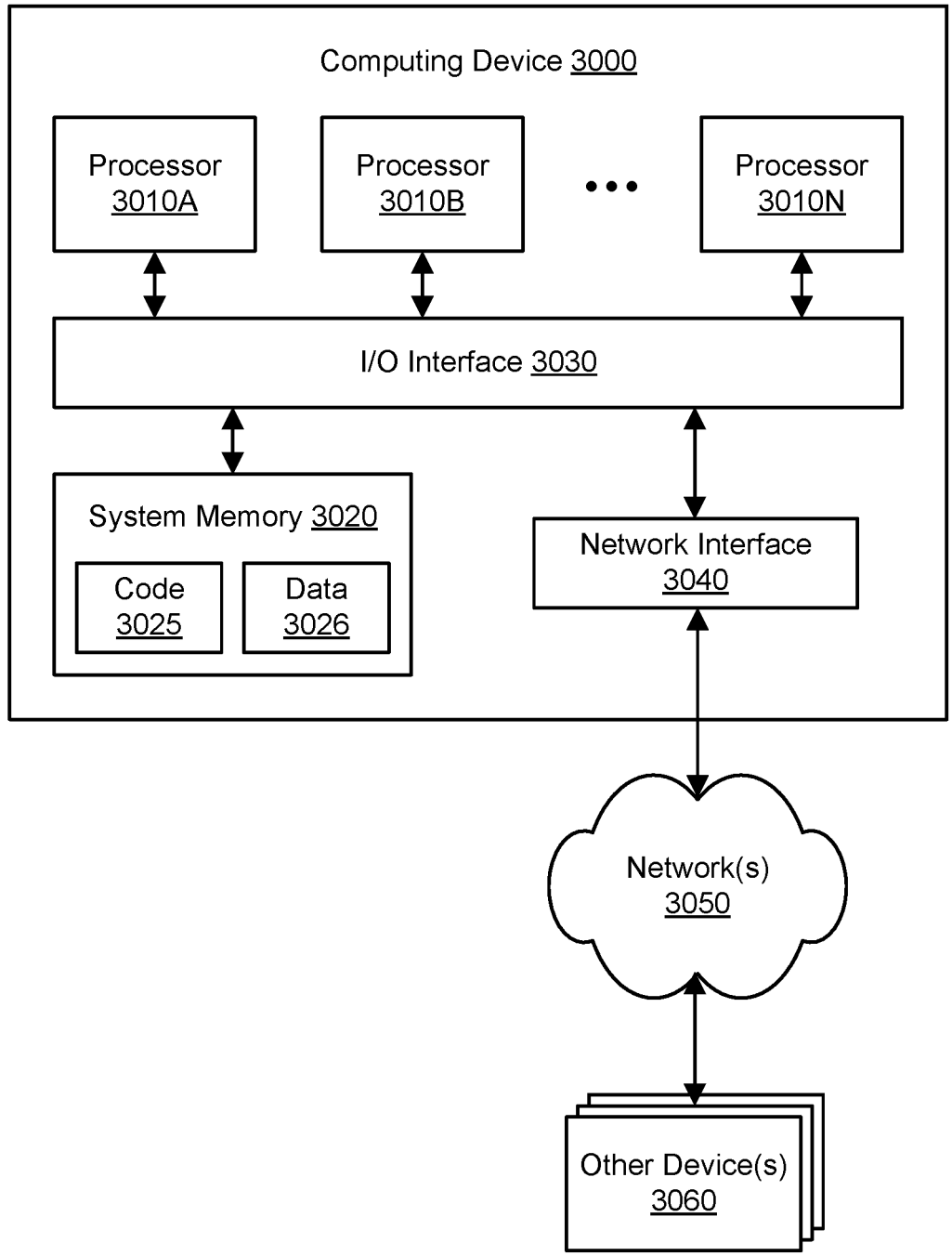
FIG. 11 illustrates an example computing device that may be used in some embodiments.

The threat modeler 100 and hosts 200 and 260A-260N may be implemented using any suitable number and configuration of computing devices, any of which may be implemented by the example computing device 600 illustrated in FIG. 11. The computing devices may be located in any suitable number of data centers or geographical locations. In various embodiments, at least some of the functionality of the threat modeler 100 may be provided by the same computing device or by different computing devices. If any of the components of the threat modeler 100 are implemented using different computing devices, then the components and their respective computing devices may be communicatively coupled, e.g., via one or more networks. Each of the components of the threat modeler 100 may represent any combination of software and hardware usable to perform their respective functions, as discussed as follows. Operations implemented by the threat modeler 100 may be performed automatically, e.g., without a need for user initiation or user intervention after an initial configuration stage, and programmatically, e.g., by execution of program instructions on at least one computing device. It is contemplated that the threat modeler 100 and hosts 200 and 260A-260N may include additional components not shown, fewer components than shown, or different combinations, configurations, or quantities of the components shown.

The threat modeler 100 and hosts 200 and 260A-260N may be implemented in a service-oriented system in which multiple services collaborate according to a service-oriented architecture. In such an environment, the threat modeler 100 may offer its functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the threat modeler 100. To enable clients to invoke its functionality, the threat modeler 100 may expose any suitable interface(s), such as one or more APIs or other programmatic interfaces and/or graphical user interfaces (GUIs). In one embodiment, the functionality of the threat modeler 100 may be offered to clients in exchange for fees.

Components of the enterprise 185, such as ETL tools that provide information about software products and their relationships, may convey network-based service requests to the threat modeler 100 via one or more networks. In various embodiments, the network(s) may encompass any suitable combination of networking hardware and protocols necessary to establish network-based communications between the enterprise 185 and the threat modeler 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both the software products 180 (and associated ETL tools) and the threat modeler 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the enterprise 185 and the Internet as well as between the Internet and the threat modeler 100. It is noted that in some embodiments, the enterprise 185 may communicate with the threat modeler 100 using a private network rather than the public Internet.

In one embodiment, aspects of the threat modeler 100 and hosts 200 and 260A-260N may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 3A:
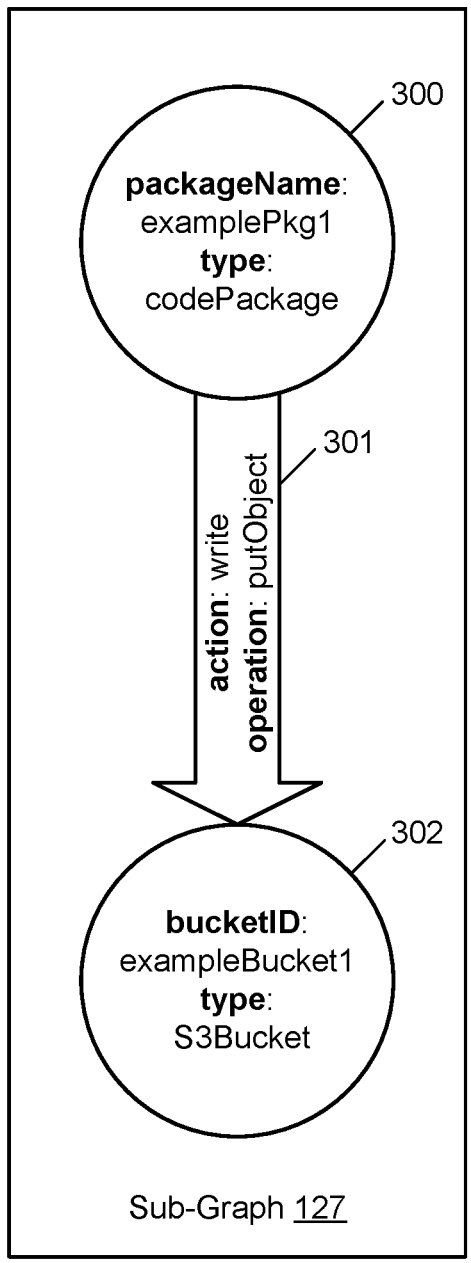
FIG. 3A and FIG. 3B illustrate example sub-graphs usable for automated threat modeling, according to some embodiments.
Figure 3B:
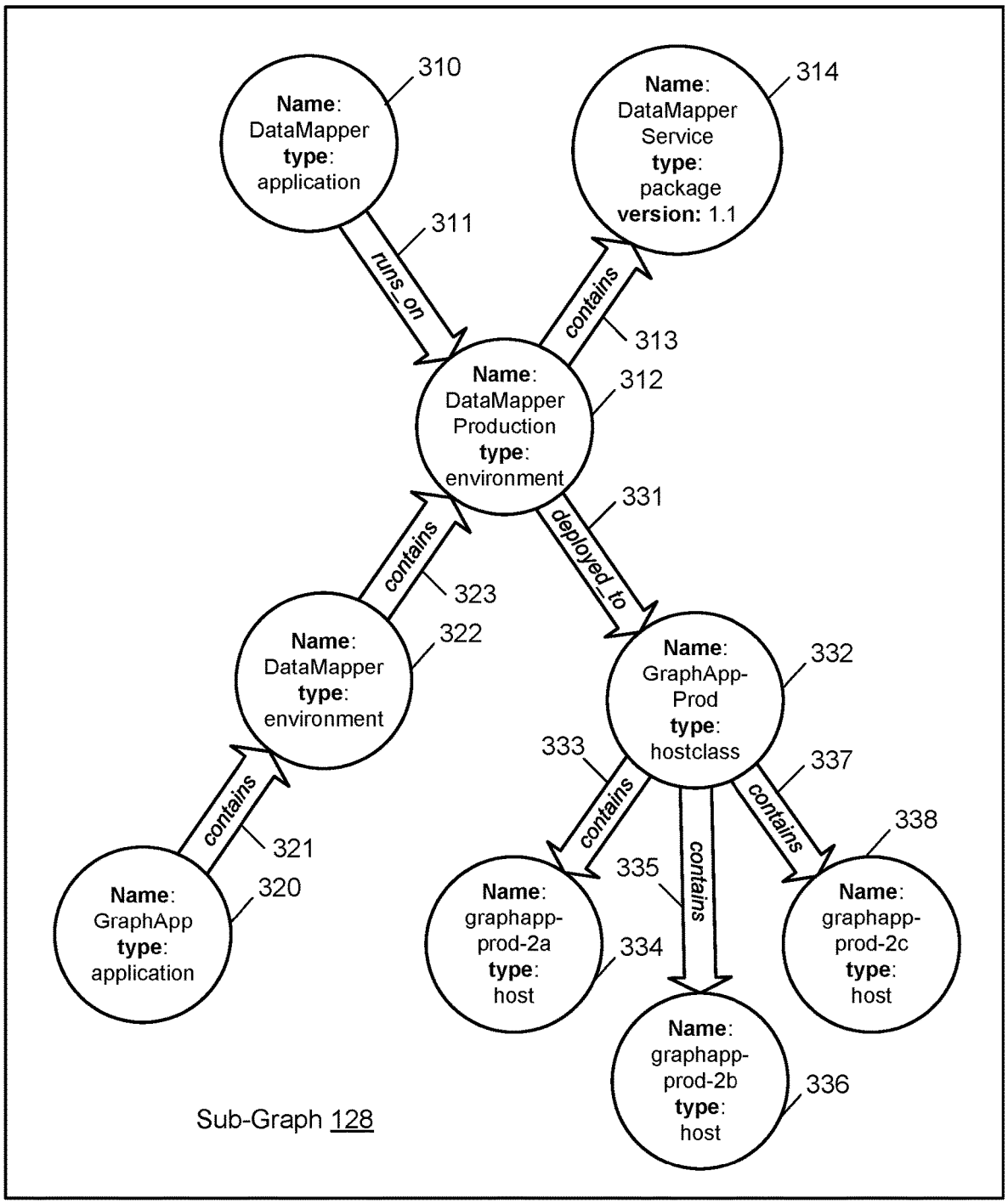

FIG. 3A and FIG. 3B illustrate example sub-graphs usable for automated threat modeling, according to some embodiments. FIG. 3A shows an example sub-graph 127 with two nodes 300 and 302 and one edge 301. Node 300 may represent a particular code package that makes putObject requests to write to a specific storage object (e.g., a bucket in a storage service). Node 300 may include metadata describing the package name ("examplePkg1") and the component type ("codePackage"). Node 302 may represent the destination storage object and include metadata describing the bucket identifier ("exampleBucket1") and the component type ("S3Bucket"). A directed edge 301 may represent the relationship between the two nodes and may include metadata describing the action ("write") and specific operation ("putObject"). In one embodiment, the terms in the graph metadata may be used consistently throughout the entire graph 125, e.g., such that the same types of components have consistent component type descriptions and the same types of actions have consistent descriptions.

The sub-graph 127 may be built or augmented using the graph builder 120 based (at least in part) on automated relationship analysis 110. In response to an event that involves examplePkg1 or exampleBucket1 or the write action between them, the sub-graph 127 may be updated and then subjected to automated threat modeling using sub-graph traversal. For example, if the access control policy for exampleBucket1 has been modified (as indicated by an event), then the sub-graph 127 may be reviewed using the rules engine(s) 160 to determine whether any security vulnerabilities have been introduced by the change.

FIG. 3B shows an example sub-graph 128 associated with a DataMapperService and related components. Each node (vertex) may include a component type as well as one or more uniquely identifying attributes such as a name, a version, and so on. Using the type combined with the uniquely identifying attribute(s), each node in the graph(s) 125 may be uniquely and deterministically identifiable. By ensuring that each node is uniquely identifiable, the threat modeler 100 may accurately identify the relevant sub-graph for a given event. Each edge in a graph may be associated with two nodes, may have a direction, and may have a label that generally describes the relationship. In the example sub-graph 128, a node 310 may represent an application named DataMapper. An edge 311 may indicate that node 310 runs on a node 312 representing an execution environment named DataMapperProduction. An edge 313 may indicate that the node 312 contains a package named DataMapperService having a version number of 1.1. A node 320 may represent another application 320 named GraphApp. A node 322 may represent another environment named DataMapper. An edge 321 may indicate that node 320 contains node 322, and an edge 323 may indicatye that node 322 contains node 312. Node 312 may be deployed to a hostclass named GraphApp-Prod as represented by node 332 and edge 331. The hostclass node 322 may contain three individual named hosts (graphapp-prod-2a, graphapp-prod-2b, and graphapp-prod-2c) as indicated by nodes 334, 336, and 338 and edges 333, 335, and 336.

The sub-graph 128 may be built or augmented using the graph builder 120 based (at least in part) on automated relationship analysis 110. In response to an event that involves any of the applications, environments, packages, hostclass, or hosts shown in FIG. 3B, the sub-graph 128 may be updated and then subjected to automated threat modeling using sub-graph traversal. For example, if the access credentials for the graphapp-prod-2b host have been modified (as indicated by an event), then all or part of the sub-graph 128 may be reviewed using the rules engine(s) 160 to determine whether any security vulnerabilities have been introduced by the change. As another example, if a different version of the DataMapperService package (represented by node 312) is deployed to replace version 1.1, then all or part of the sub-graph may be reviewed using the rules engine(s) 160 to determine whether any security vulnerabilities have been introduced by the change.

Figure 4:
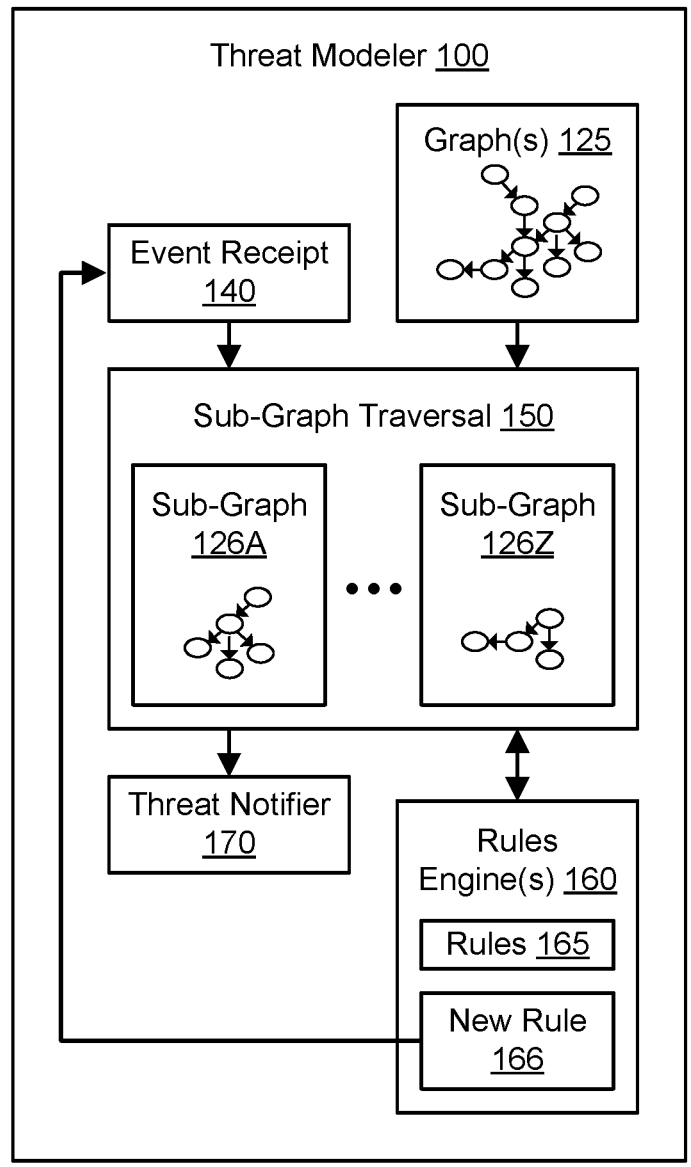
FIG. 4 illustrates further aspects of the example system environment for automated threat modeling using application relationships, including the addition of a new rule to a rules engine as a trigger for automated threat modeling of multiple sub-graphs, according to one embodiment.

FIG. 4 illustrates further aspects of the example system environment for automated threat modeling using application relationships, including the addition of a new rule to a rules engine as a trigger for automated threat modeling of multiple sub-graphs, according to one embodiment. In one embodiment, an event received by the event receipt component 140 may be indicative of a new rule 166 added to a rules engine used for threat modeling. The new rule 166 may represent a modification to a prior rule or may instead represent an entirely new rule, e.g., to detect a newly discovered security threat or vulnerability. In one embodiment, an event received by the event receipt component 140 may be indicative of a new policy added to an analyzer used for threat modeling. In one embodiment, the threat modeler 100 may seek to review the entire graph 126 (or large portions of the graph) with respect to the new rule or new policy. Accordingly, the threat modeler 100 may perform sub-graph traversal for threat analysis using the new rule 166 or new policy for a plurality of sub-graphs 126A-126Z. In order to use computing resources efficiently for a large enterprise with a large number of sub-graphs, the threat modeler may roll out the new rule or new policy to various sub-graphs 126A-126Z over hours, days, or even weeks. As discussed above, the threat modeler 100 may generate notifications to interested parties (including users and/or automated systems) using the threat notifier 170 if any software components are found to match the new rule 166 or to violate the new policy. Matching a rule may represent a violation of a policy for security best practice and may result in a finding that a software component represents a security threat or vulnerability.

Figure 5:
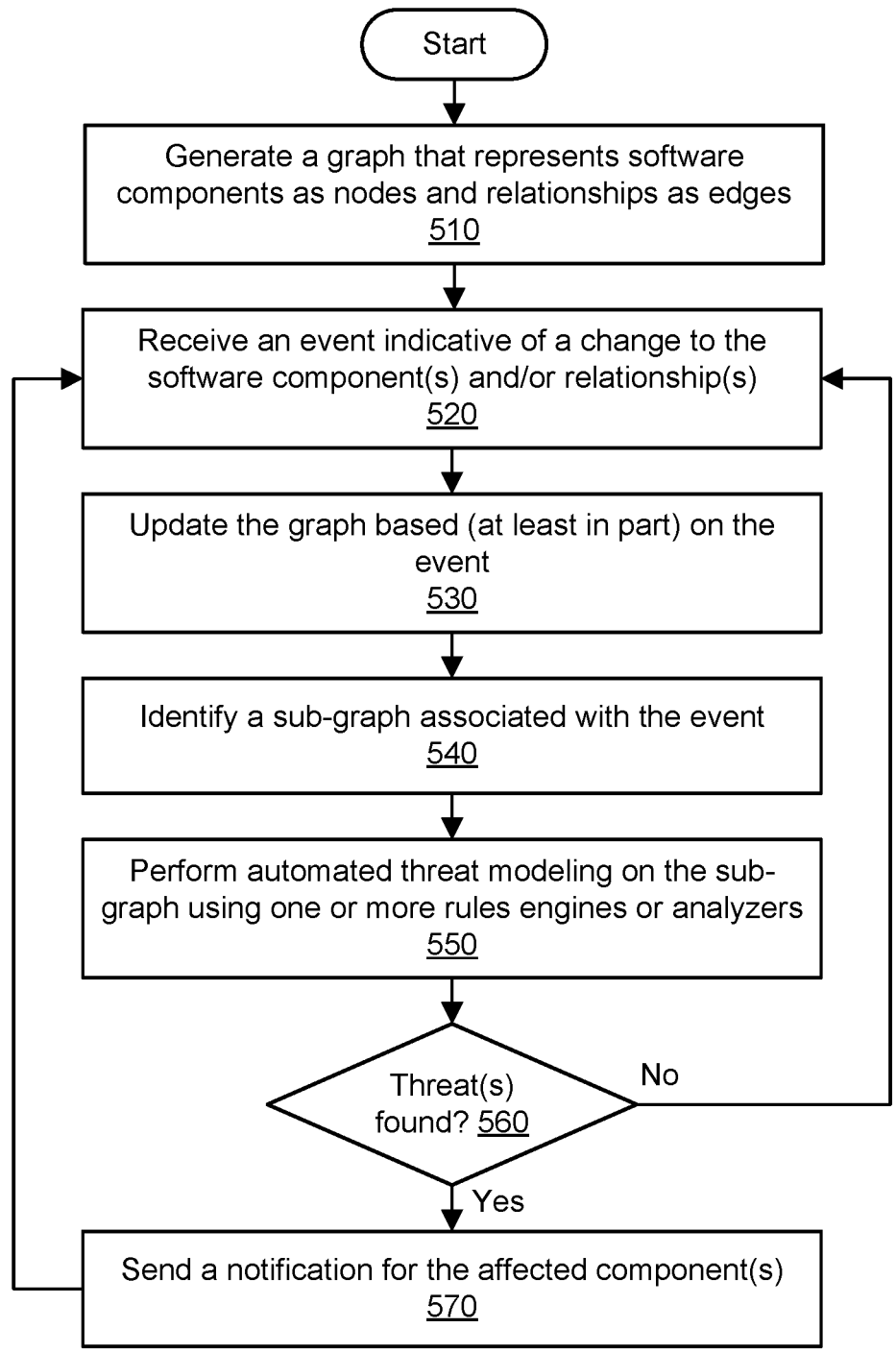
FIG. 5 is a flowchart illustrating a method for automated threat modeling using application relationships, according to one embodiment.

FIG. 5 is a flowchart illustrating a method for automated threat modeling using application relationships, according to one embodiment. As shown in 510, a graph may be generated. The graph may include a plurality of nodes representing software components and a plurality of edges represent relationships between software components. The edges may include directed edges. In one embodiment, the graph may be a directed acyclic graph. The relationships may include relationships between components of a single application and/or relationships from one application to another application. For example, two connected nodes may represent an application and a storage object in a storage service, and the edge between the nodes may represent that the application stores data in that storage object. The graph may capture a complex web of intra-application and inter-application relationships in an enterprise, such that different portions of the graph (sub-graphs) may represent different applications or services. For a sufficiently large enterprise, the enterprise-wide graph may include vast numbers of nodes.

In one embodiment, the graph may be built using automated techniques such as static code analysis and/or dynamic (runtime) analysis. Static code analysis may include analysis of program code of applications and their components, e.g., to determine intra-application and inter-application relationships reflected in the program code. Runtime analysis may include call tracing among instances of applications and their components, e.g., to determine intra-application and inter-application relationships reflected in real-world service calls. In one embodiment, the graph may be built initially based on user input (e.g., using one or more tools that permit users to describe application architectures) and then modified and/or corrected using the automated techniques to reduce human error. In one embodiment, the user tool(s) for describing application architectures and the tool for automated graph building may use a similar or identical set of terms for application types, relationship types, datatypes, and so on, in order to facilitate the use of the user-supplied information for automated graph building. In one embodiment, the graph may include metadata for individual nodes and edges, and the metadata may indicate unique node identifiers, unique edge identifiers, node types, edge types, and so on. Using such metadata, each node and/or edge may be uniquely identified in the graph. In one embodiment, additional metadata may be stored outside of the graph, e.g., in a storage service at a location or key associated with a node or edge in the graph itself.

As shown in 520, an event may be received, e.g., by a threat modeler. The event may be indicative of a change to one or more of the nodes or edges in the graph. For example, the event may describe a change to the program code of a software component. As another example, the event may describe a change to the configuration of a software component. As yet another example, the event may describe a change to a relationship between two software components. Events may be generated by software development environments. An event may include data such as one or more affected software components or relationships that correspond to nodes or edges in the graph. The affected nodes or edges may be identified by comparing the graph metadata (e.g., the unique identifiers of nodes and edges) to the information in the event. In one embodiment, the event may be indicative of a new rule added to a rules engine used for threat modeling. The threat modeler may subscribe to events for changed software products and new rules, e.g., via an event streaming service. Events may be received repeatedly and at different times after the graph is built. Events may be received throughout the lifecycle of a particular software product, e.g., when the software is designed, implemented, tested, deployed, updated with minor updates, updated with major updates, and so on. By triggering the automated threat analysis on such events, a particular software product may undergo a security review again and again as the product or its relationships change.

As shown in 530, the graph may be modified based (at least in part) on the event. In modifying the graph, the threat modeler may add one or more nodes, add one or more edges, remove one or more nodes, remove one or more edges, modify the metadata for one or more nodes, modify the metadata for one or more edges, and/or update the graph in any other suitable manner. For example, if the event indicates that the program code has been updated to store a particular datatype in a particular location in a storage service, the threat modeler may add a node for that storage service (with metadata indicating the particular location) and a directed edge connecting the software product to the storage service. As another example, the graph metadata for the updated portion of the graph may be modified to indicate the datatypes of source data and destination data for a new relationship. In one embodiment, the graph may be updated by using one or more ETL (Extract, Transform, Load) tools to extract relevant data from a service or subsystem associated with the affected node(s) and then using that extracted data to modify particular elements of the graph.

As discussed above, the graph may capture a complex web of intra-application and inter-application relationships in an enterprise, such that different portions of the graph (sub-graphs) may represent different applications or services. As shown in 540, a sub-graph associated with the event may be identified in the graph. In one embodiment, the sub-graph may include a plurality of nodes rooted at one or more nodes associated with a software product affected by the event. For example, if a component of an application is updated with new program code, then a sub-graph of other components that are dependent on the updated component may be identified. As another example, if an access policy on a storage object is changed, then the sub-graph may include nodes associated with that storage object.

As shown in 550, threat modeling may be performed on the sub-graph. In one embodiment, the threat modeling may be performed using one or more rules engines or analyzers. A rules engine may apply one or more rules to metadata associated with nodes and edges of the sub-graph to determine whether security threats or vulnerabilities are present in those nodes or edges. An analyzer may determine whether one or more policies are met or violated by the nodes and edges of the sub-graph. To perform this threat modeling, the sub-graph may be traversed from one or more root nodes in a process termed micro-traversal. The extent of the micro-traversal (e.g., the point at which the traversal ends) may be determined by the requirements of particular rules or policies. The entire graph for an enterprise may be large and complex, and the use of micro-traversal of a sub-graph may permit the threat modeling to be performed efficiently and in a focused manner. The rules or policies may be written by developers to detect particular security threats and/or compliance with best practices. In one embodiment, a main rules engine or analyzer may be used for common threats, and additional rules engines or analyzers may be added to detect new or uncommon threats. In applying a rule to a sub-graph, metadata about nodes and edges may be extracted from the graph and used to determine whether the rule matches any portion of the sub-graph. The metadata may describe properties such as authentication properties, authorization properties, access control properties, datatype properties, and so on. Micro-traversals to apply rules or policies to sub-graphs may automate data-gathering and decision-making operations such as determining what a component does, determining what kind of data the component has, determining where the data is sent or stored, determining what protections are on the handling of the data, determining who has access to the hosts where code or data is located, and so on.

As shown in 560, the method may determine whether a security threat or vulnerability is present in the software product or whether the software product complies with (or instead violates) applicable policies. A particular rule or policy may dictate whether a threat or vulnerability is present based (at least in part) on the elements of the rule or policy as applied to the metadata associated with nodes and edges of the sub-graph. For example, if a node in the sub-graph acquires sensitive data such as user payment information and then stores that information in an insecure manner (e.g., as plaintext in a storage service bucket), then an applicable rule or policy may determine that the node represents a security threat and/or violates a best practice.

As shown in 570, if a threat or instance of policy noncompliance is found, then an owner or manager associated with the affected node may be notified about the threat or noncompliance. Contact information for the owner or manager (e.g., an e-mail address or messaging address) may be extracted from the node itself or from metadata associated with the node and stored outside the graph, and a notification may be generated and sent to that contact address. In one embodiment, a notification may be provided to a subsystem that implements the affected node(s) or a management console associated with the affected node(s). In some embodiments, the content of a notification may vary based (at least in part) on the rule or policy that was violated. A notification may indicate data such as a name or identifier of the insecure node or relationship, a name or description of the rule or policy that was violated, a datatype that was handled insecurely, a description of the event that triggered the automated threat modeling, a timestamp of the event, a timestamp of the threat modeling, a classification of the risk level (e.g., high, medium, or low), and/or other suitable data usable by the owner or manager to mitigate the security threat.

Automated Selection of Secure Design Patterns

Figure 6A:
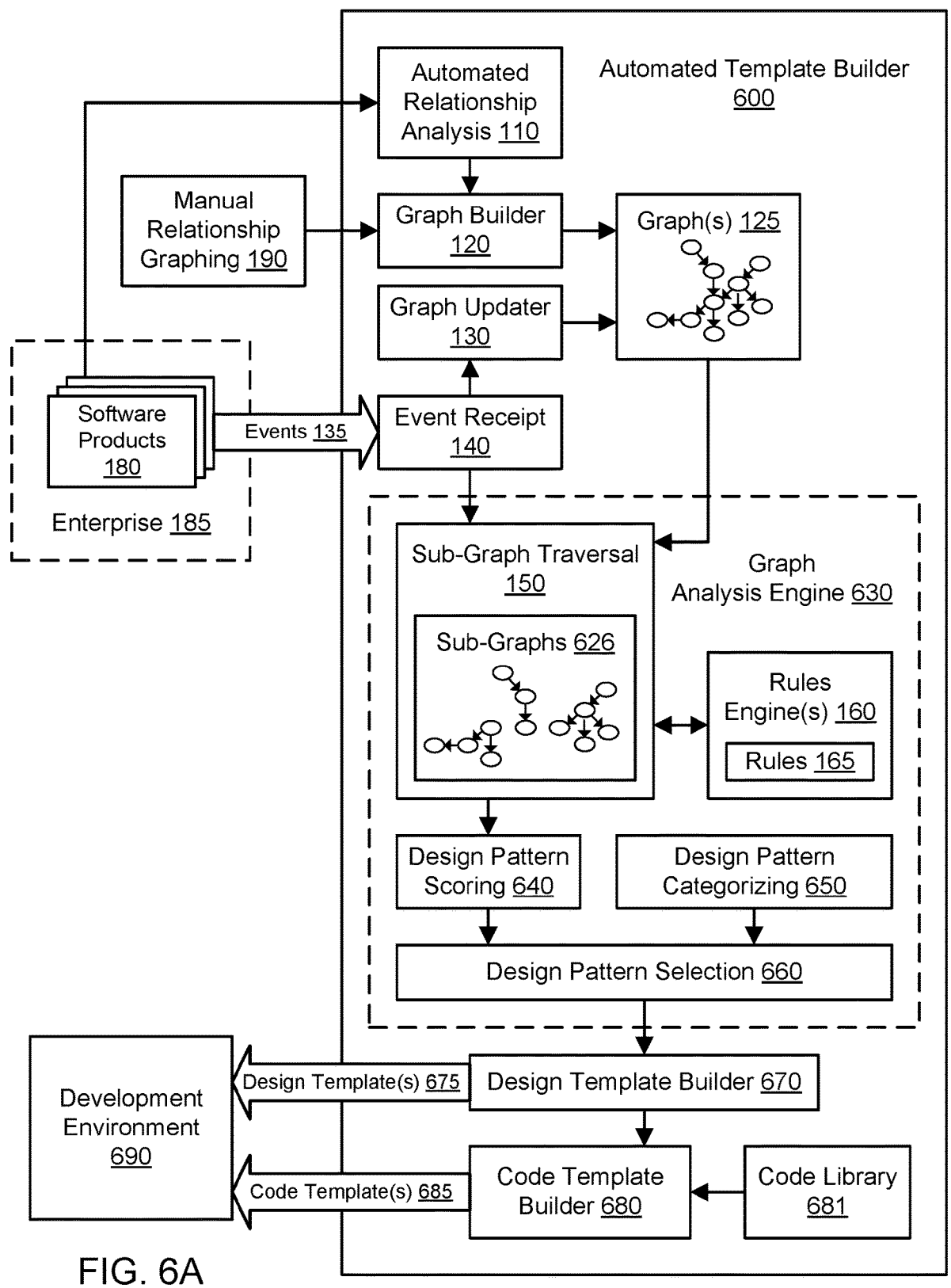
FIG. 6A and FIG. 6B illustrate an example system environment for automated selection of secure design patterns, according to some embodiments.
Figure 6B:
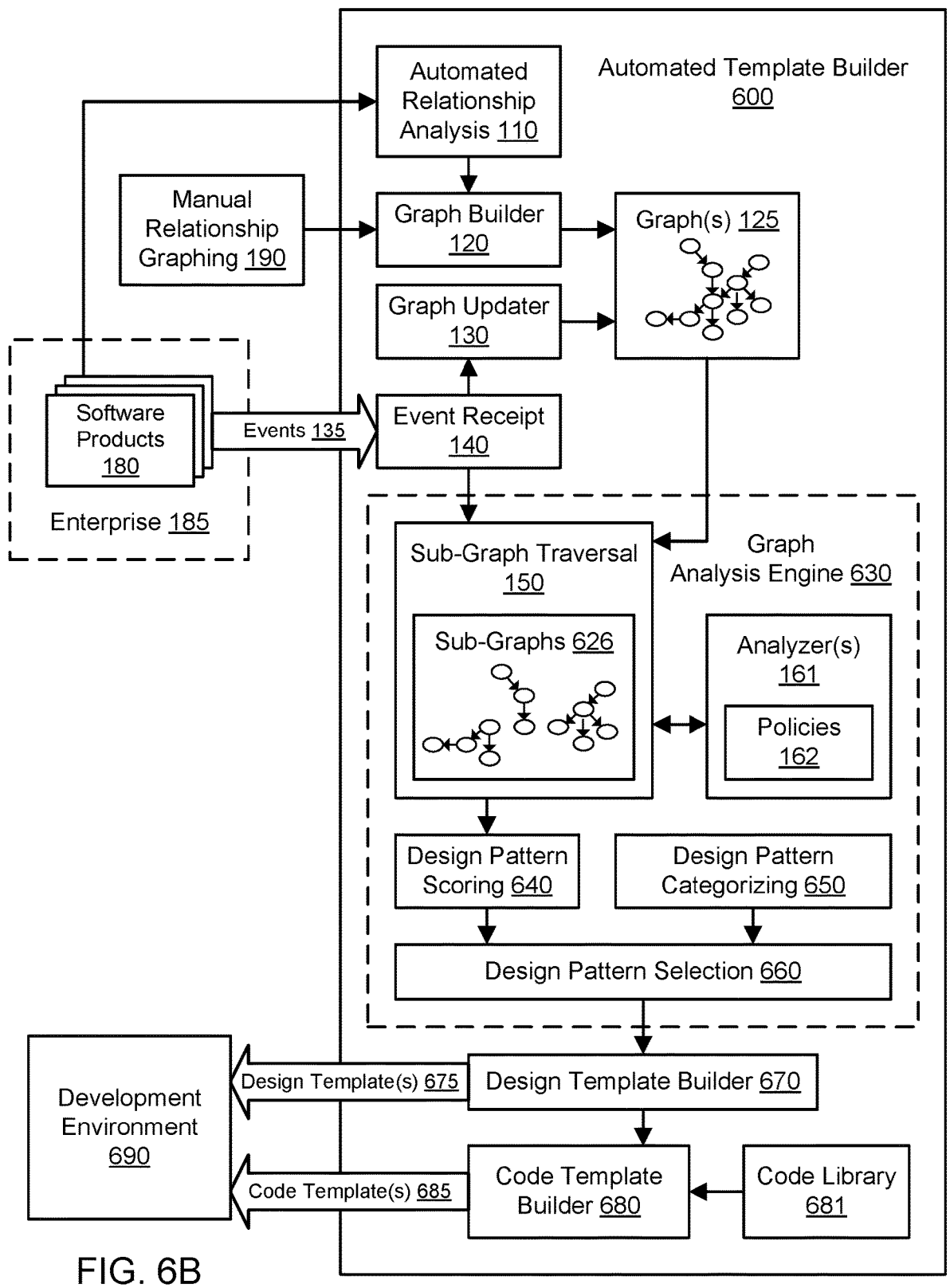

FIG. 6A and FIG. 6B illustrate an example system environment for automated selection of secure design patterns, according to some embodiments. As discussed above, a threat modeler may automated techniques to perform threat modeling for software products 180. As shown in FIG. 6A and FIG. 6B, similar techniques may be used for automated selection of secure or policy-compliant design patterns by an automated template builder 600. The design patterns may then be used for building additional software products that are relatively secure and/or compliant with applicable policies. The policies may be security-related, and the automated template builder 600 may thus attempt to determine whether security threats, vulnerabilities, or other security-related flaws are present in software products 180. The policies may also relate to best practices for software development, for identifying availability concerns, for identifying privacy concerns, for enforcing service-level agreements (SLAs), and so on. Software products 180 may include executable program code such as applications, services, components of applications, components of services, and so on. The terms "application" and "service" may be used interchangeably herein. Components of software products 180 may include executable programs (e.g., applications, services, packages, and so on), configurations of programs, storage resources (e.g., as managed by network-accessible storage services), configurations of storage resources, database tables, execution environments, hosts or other computing devices, network devices (e.g., routers and load balancers), network entities (e.g., virtual private clouds), abstractions such as host classes, containers, tasks submitted to program execution services, other network-accessible services, and so on.

In various embodiments, the automated template builder 600 may include or invoke various components discussed above with respect to the threat modeler 100, such as the component for automated relationship analysis 110, the graph builder 120, the graph updater 130, the component for event receipt 140, the component for sub-graph traversal 150, one or more rules engines 160 (as shown in FIG. 6A), and one or more analyzers 161 (as shown in FIG. 6B). As will be discussed below, the automated template builder 600 may also include a graph analysis engine 630, a component 640 for assigning scores to design patterns, a component 650 for assigning design patterns to categories of functionality, a component 660 for selecting design patterns that are relatively secure and/or policy compliant, a component 670 for building secure and/or policy-compliant design templates 675, and a component 680 for building secure and/or policy-compliant code templates 685 based (at least in part) on the design templates 675 and a code library 681. The design templates 675 and code templates 685 may be provided to a development environment 690 for building software components using the templates.

Using the graph builder 120, one or more graphs 125 may be generated. The graph(s) 125 may include a plurality of nodes representing software components and a plurality of edges representing relationships between software components. In one embodiment, each of many graphs 125 may represent components of a particular application, and sub-graphs within a graph may represent different functionalities of the application. The edges may include directed edges. In one embodiment, the graph(s) 125 may include directed acyclic graphs. The relationships may include relationships between components of a single application and/or relationships from one application to another application. For example, two connected nodes may represent an application and a storage object in a storage service, and the edge between the nodes may represent that the application stores data in that storage object. The graph(s) may capture a complex web of intra-application and inter-application relationships in an enterprise 185, such that different portions of the graph(s) (sub-graphs) may represent different applications, services, or functionalities. For a sufficiently large enterprise 185, an enterprise-wide graph 125 may include vast numbers of nodes. In one embodiment, some portions of the graph(s) 125 may be unconnected to (and unreachable by) other portions of the graph(s). The graph(s) 125 may represent a machine-consumable model of software products 180, their components, and the relationships between products and components.

In one embodiment, the graph(s) may be built using automated relationship analysis 110, e.g., using properties of the software products 180 themselves as input. For example, the automated relationship analysis 110 may include static code analysis, dynamic (runtime) analysis, and/or metadata acquisition. Static code analysis may include analysis of program code of applications and their components, e.g., to determine intra-application and inter-application relationships reflected in the program code. Runtime analysis may include call tracing among instances of applications and their components, e.g., to determine intra-application and inter-application relationships reflected in real-world service calls. In one embodiment, the graph(s) may be built by using one or more ETL (Extract, Transform, Load) tools to extract relevant metadata from services or subsystems associated with the software products 180 and then using that extracted metadata to generate particular elements of the graph. For example, a software deployment system may link code packages to computing devices where the packages are intended to run; metadata capturing such relationships may be acquired and used to generate an edge between a code package and a device in the graph(s) 125. The ETL tools may vary across different services or subsystems of the enterprise 185, such as different package management systems, database services, network-accessible or "cloud-based" storage services, application environments, containerization systems, and so on.

In one embodiment, the graph(s) may be built initially based on user input, e.g., as captured using one or more tools for manual relationship graphing 190. For example, the graphing tool(s) 190 may permit developers to manually draw relationships between components of a software product in a graphical user interface. However, such user input may be incorrect or inaccurate or may become outdated at some point during the lifecycle of the software product. In one embodiment, to reduce or even eliminate such human error, the user-supplied initial graph may be modified, corrected, and/or augmented using the automated relationship analysis 110. In one embodiment, the user tool(s) 190 for describing application architectures and the tool for automated relationship analysis 110 may use a similar or identical set of terms for application types, relationship types, datatypes, and so on, in order to facilitate the use of the user-supplied information for automated graph building. In one embodiment, all or part of the graph(s) 125 may be vended back to the graphing tool(s) 190 for visualization to users and/or to solicit further user input regarding the graph.

In one embodiment, the graph(s) 125 may include metadata for individual nodes and edges, and the metadata may indicate unique node identifiers, unique edge identifiers, node types, edge types, and so on. Using such metadata, each node and/or edge may be uniquely identified in the graph(s) 125. In one embodiment, additional metadata may be stored outside of the graph(s) 125, e.g., in a storage service at a location or key associated with a node or edge in the graph itself. For example, contact information for an owner of a node may be stored external to the graph(s) 125, e.g., in a database or storage service, and such information may be retrievable using a key or other identifier stored within the graph.

Using the event receipt component 140, events 135 may be received over time. Receipt of an event may trigger the updating of the graph(s) 125. Receipt of an event may trigger sub-graph traversal 150 for a portion of the graph(s) 125, e.g., as invoked by the graph analysis engine 630 for selecting design patterns. An event may be indicative of a change to one or more of the nodes or edges in the graph. For example, the event may describe a change to the program code of a software component. As another example, the event may describe a change to the configuration of a software component. As yet another example, the event may describe a change to a relationship between two software components. Events may be generated by elements of the enterprise 185, such as software development environments in which program code is managed or ETL tools associated with various subsystems or services of the enterprise. An event may include data such as identifiers of one or more affected software components or relationships that correspond to nodes or edges in the graph. The automated template builder 600 may subscribe to events for changed software products and new rules, e.g., via an event streaming service. Events may be received repeatedly and at different times after the graph(s) 125 are built. Events may be received throughout the lifecycle of a particular software product, e.g., when the software is designed, implemented, tested, deployed, updated with minor updates, updated with major updates, and so on. By triggering the sub-graph traversal 150 and resulting design pattern selection 660 on such events, changes to software products or their relationships may repeatedly produce additional automated review for security and/or policy compliance.

Using the graph updater 130, the graph(s) 125 may be modified based (at least in part) on an event. The affected nodes or edges may be identified by comparing the graph metadata (e.g., the unique identifiers of nodes and edges) to the information in the event. In modifying the graph(s) 125, the graph updater 130 may add one or more nodes, add one or more edges, remove one or more nodes, remove one or more edges, modify the metadata for one or more nodes, modify the metadata for one or more edges, and/or update the graph(s) in any other suitable manner. For example, if the event indicates that the program code has been updated to store data having a particular datatype in a particular location in a storage service, the graph updater 130 may add a node for that storage service (with metadata indicating the particular location) and a directed edge connecting the software product to the storage service. As another example, the graph metadata for the updated portion of the graph(s) may be modified to indicate the datatypes of source data and/or destination data for a new relationship. In one embodiment, the graph(s) 125 may be updated by using one or more ETL (Extract, Transform, Load) tools to extract relevant data from a service or subsystem associated with the affected node(s) and then using that extracted data to modify particular elements of the graph(s).

As discussed above, the graph(s) may capture a complex web of intra-application and inter-application relationships in an enterprise, such that different portions of the graph(s) (sub-graphs) may represent different applications or services. Using the component for sub-graph traversal 150, a sub-graph 126 associated with an event may be identified in the graph(s) 125. In one embodiment, the sub-graph 126 may include a plurality of nodes rooted at one or more nodes associated with a software product affected by the event. For example, if a component of an application is updated with new program code, then a sub-graph of other components that are dependent on the updated component may be identified. As another example, if an access policy on a storage object is changed, then the sub-graph may include nodes associated with that storage object.

In one embodiment, a graph analysis engine 630 of the automated template builder 600 may invoke the component for sub-graph traversal 150 for particular sub-graphs 626. The sub-graphs 626 under analysis may represent different functionalities of one or more application or services and may include all or part of the nodes and edges in the graph(s) 125. Using the component for sub-graph traversal 150, each of the sub-graphs 626 may be walked and subjected to analysis of rules 165 by one or more rules engines (as shown in FIG. 6A) or to analysis of compliance with one or more applicable policies 162 by one or more analyzers 161 (as shown in FIG. 6B). A rules engine may apply one or more rules 165 to metadata associated with nodes and edges of the sub-graph 126 to determine whether security threats or vulnerabilities are present in those nodes or edges. Using metadata associated with nodes and edges of the sub-graph 126, an analyzer may determine whether the sub-graph is in compliance with one or more policies 162. In one embodiment, the analyzer(s) 161 may include one or more rules engines. To perform this graph analysis, a sub-graph may be traversed from one or more root nodes in a process termed micro-traversal. The extent of the micro-traversal (e.g., the point at which the traversal ends) may be determined by the requirements of particular rules or policies. The entire graph for an enterprise 185 may be large and complex, and the use of micro-traversal of a particular sub-graph may permit the threat modeling to be performed efficiently and in a focused manner. In one embodiment, the sub-graph traversal 150 may implement generational graph traversal in which interested consumers (e.g., rules engines or analyzers) minimize graph operations (e.g., obtaining edges for a vertex or obtaining paths from one vertex to another vertex) by piggybacking on a single graph operation and exposing the results to a set of consumers.

The rules 165 for the rules engine(s) 160 may be written by developers to detect particular security threats. The policies 162 may be developed by users to determine whether software products are in compliance with best practices, e.g., to protect against security threats and vulnerabilities. In one embodiment, a main rules engine or analyzer may be used for common threats, and additional rules engines or analyzers may be added to detect new threats, uncommon threats, and/or threats requiring more complex analysis. In applying a rule to a sub-graph, metadata about nodes and edges may be extracted from the graph(s) and used to determine whether the rule matches any portion of the sub-graph. The metadata may describe properties such as authentication properties, authorization properties, access control properties, datatype properties, and so on. Micro-traversals to apply rules or policies to sub-graphs may automate data-gathering and decision-making operations such as determining what a component does, determining what kind of data the component has, determining where the data is sent or stored, determining what protections are on the handling of the data, determining who has access to the hosts where code or data is located, and so on.

For a given sub-graph and a given rule, the sub-graph traversal 150 may determine whether or not a security threat or vulnerability is present in a software product or software component or portion thereof. A particular rule may dictate whether a threat or vulnerability is present based (at least in part) on the elements of the rule as applied to the metadata associated with nodes and edges of the sub-graph. For example, if a node in the sub-graph acquires sensitive data such as user payment information and then stores that information in an insecure manner (e.g., as plaintext in a storage service bucket), then an applicable rule may determine that the node represents a security threat. Similarly, the sub-graph traversal 150 may dictate whether component(s) of the sub-graph are in compliance with a particular policy, e.g., based (at least in part) on the elements of the policy as applied to the metadata associated with nodes and edges of the sub-graph. For example, applicable policies may indicate that a particular form of encryption must be used to access a particular component, that a set of approved storage services or configurations must be used to store sensitive data, that various standards must be complied with within a business entity, and so on.

In one embodiment, one or more sub-graphs may correspond to a particular design pattern. A design pattern common to multiple sub-graphs or applications may include the same or similar set of components that interact in the same or similar manner. For example, turning back to the example of FIG. 3B, the components and interactions of the DataMapper Production environment 312, GraphApp-Prod hostclass 332, and hosts 334, 336, and 338 may be found in the sub-graph 128 and in a similar form in other sub-graphs; these components and their interactions may thus represent a particular design pattern. The automated template builder 600 may include a component 640 for assigning scores to sub-graphs or the corresponding design patterns. A score assigned by the component 640 may be generated based on the detection of any unmitigated security threats or the detection of policy compliance or noncompliance during the sub-graph traversal 150. A score may represent the relative security or policy compliance of a sub-graph. Scores may be assigned on any suitable basis such that different sub-graphs may be ranked in their security or policy compliance. In one embodiment, a sub-graph or design pattern may be assigned a superior score if the sub-graph or design pattern is longer (e.g., in terms of the extent of the sub-graph's relationships). In one embodiment, a sub-graph or design pattern may be assigned a superior score if the sub-graph or design pattern has fewer unique unmitigated threats. In one embodiment, a design pattern may be assigned a superior score if the design pattern is found more frequently among the sub-graphs 626.

The automated template builder 600 may include a component 650 for assigning sub-graphs or design patterns to categories of functionality. The sub-graphs and design patterns may belong to different categories of functionality such as internal web applications, external web applications, internal RESTful service, and so on. The categories may include sub-categories such as payment systems, user authentication, storage of secure data, and so on. A sub-graph or design pattern may belong to multiple categories and/or multiple sub-categories. In one embodiment, the categorizing 650 may be performed using automated techniques, e.g., for detecting a category based (at least in part) on the components and/or relationships of a sub-graph or design pattern. For example, if a sub-graph or design pattern stores payment information using a secure storage component, then that sub-graph or design pattern may be automatically classified under one or more payment-related categories such as "payment system." The categorizing 650 may be performed using contextual information such as the location of the software product within a network, the division of an organization to which the product belongs, or other ownership information. In one embodiment, metadata associated with nodes and/or edges of the graph(s) 125 may capture contextual information such as location information and/or ownership information for software components; such metadata may be stored with the graph(s) 125 and used for categorizing 650. For example, if graph metadata indicates that a particular sub-graph is managed by a payment processing department, then the sub-graph may be categorized under one or more payment-related categories. In one embodiment, the categorizing 650 may be performed using user input, e.g., as solicited from a developer of the corresponding software product. In one embodiment, the categories may be manually created or curated by one or more users or administrators of the template builder 600.

The automated template builder 600 may include a component 660 for selecting sub-graphs or design patterns that are relatively secure and/or policy compliant. In one embodiment, the design pattern selection 660 may be performed using the scores for various sub-graphs or their corresponding design patterns. In one embodiment, the design pattern selection 660 may be performed for each of many categories or sub-categories. For example, if a lower score indicates a more secure pattern, then the sub-graphs or design patterns assigned to a particular category may be examined to select the sub-graph or design pattern with the lowest score. In one embodiment, factors such as the length of the sub-graph or the frequency of the design pattern may not be part of the scoring 640 but may instead be considered by the pattern selection 660. For example, a pattern with a slightly higher (less secure) score and a higher frequency of occurrence may be selected over a pattern with a slightly lower (more secure) score and a much smaller frequency of occurrence, under the assumption that the former pattern represents a more widely adopted solution than the latter pattern. In one embodiment, sub-graphs or design patterns with sufficiently secure or policy-compliant scores may be filtered out, such that only sub-graphs or design patterns that are sufficiently secure or policy-compliant may be "bucketed" and later considered for selection 660. The bucketed sub-graphs or design patterns may then be analyzed using the factors such as sub-graph length and/or design pattern frequency by the selector 660. In one embodiment, more than one sub-graph or design pattern may be selected within a category, e.g., in order to provide options to developers.

The automated template builder 600 may include a component 670 for building secure and/or policy-compliant design templates 675. The design template builder 670 may construct or generate one or more design templates 675 based (at least in part) on the selected sub-graphs or design pattern(s). The design template(s) may be populated with data or metadata indicating the types of components and the inter-component relationships found in the selected sub-graphs or design pattern(s). For example, in the category of secure payment, a design template may indicate one or more approved and secure storage services, one or more approved and secure protocols for data transmission between components, and so on. When a developer seeks to build a new application in one of the categories of functionality, a design template for that category may be provided in a development environment 690. The relevant category may be determined automatically (e.g., based on analysis of components specified by the developer) or using input from the developer. For example, if the developer is seeking to authenticate internal users within a business-specific network environment or provider network, then a design template may be selected for the developer from a category of "internal user authentication" for the particular business-specific network environment or provider network; the selected design template may indicate secure components and a secure configuration with which the developer may build the internal user authentication portion of the application. As another example, if the developer seeks to build an internal web application for users of an organization, then the design template may include components and/or configurations that comply with internal user authentication standards within the organization. The developer may add to the design template, but the automatically generated design template may initially ensure the security or policy compliance of the new application without additional work by the developer.

In one embodiment, the design template may be presented with data indicating the relative security of the template, such as the number and description of mitigated threats, the number and description of unmitigated threats, the number and description of policies complied with, and so on. In one embodiment, the design template may be manually approved by a security expert before being made available to developers. In one embodiment, a particular design template may be rejected by a particular developer, and another secure or policy-compliant template may be presented to the developer instead.

The automated template builder 600 may include a component 680 for building secure and/or policy-compliant code templates 685. The code template builder 680 may construct or generate one or more code templates 685 based (at least in part) on the design template(s) 675 or on the selected sub-graphs or design pattern(s). The code template(s) may be populated with programming language elements that are usable by a developer to build a software component according to the corresponding design template. The code template(s) 685 may be populated with programming language elements from a code library 681 of such elements. When a developer seeks to build a new application in one of the categories of functionality, a code template for that category may be provided in the development environment 690. The relevant category may be determined automatically (e.g., based on analysis of components specified by the developer) or using input from the developer. The developer may add to the code template, but the automatically generated code template may initially ensure the security or policy compliance of the new application without additional work by the developer.

In one embodiment, the code template may be presented with data indicating the relative security of the template, such as the number and description of mitigated threats, the number and description of unmitigated threats, the number and description of policies complied with, and so on. In one embodiment, the code template may be manually approved by a security expert before being made available to developers. In one embodiment, a particular code template may be rejected by a particular developer, and another secure or policy-compliant template may be presented to the developer instead.

Figure 7:
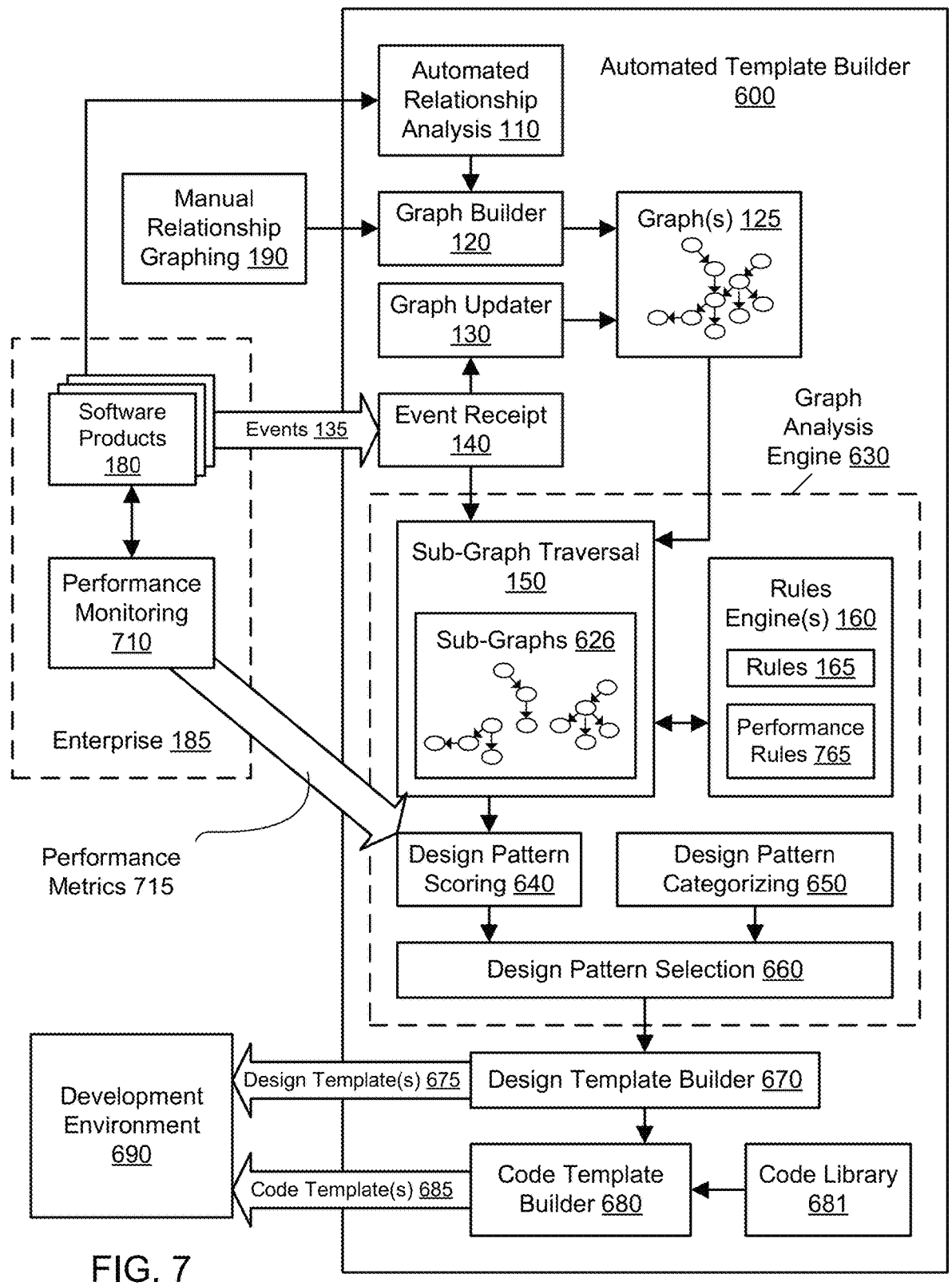
FIG. 7 illustrates further aspects of the example system environment for automated selection of secure design patterns, including the use of performance metrics in pattern scoring, according to one embodiment.

FIG. 7 illustrates further aspects of the example system environment for automated selection of secure design patterns, including the use of performance metrics in pattern scoring, according to one embodiment. In one embodiment, the software products 180 in the enterprise 185 may be subjected to performance monitoring 710. The performance monitoring 710 may generate product-specific performance metrics 715. For example, the metrics 715 may indicate the availability of different services over a period of time. As another example, the metrics 715 may indicate the processor usage, memory usage, and/or network usage of particular software products. In some embodiments, the metrics 715 may be used to augment the design pattern scoring 640 or design pattern selection 660. For example, if two design patterns have the same or similar scores for security or policy compliance, then the design pattern selection 660 may select the design pattern associated with the superior performance metrics. As another example, different sub-graphs may be assigned performance scores in addition to security scores, and one of the sub-graphs may be selected using a constrained optimization solver with various factors such as security, processor performance, memory performance, network performance, availability, and/or cost. In one embodiment, sub-graphs or design patterns may be scored according to the metrics 715 using one or more rule sets 765 related to assessing performance. In one embodiment, the design template builder 670 may also use the performance metrics 715. For example, the resulting design template(s) 675 may indicate a preferred load balancer configuration that was found in the selected design pattern.

Figure 8A:
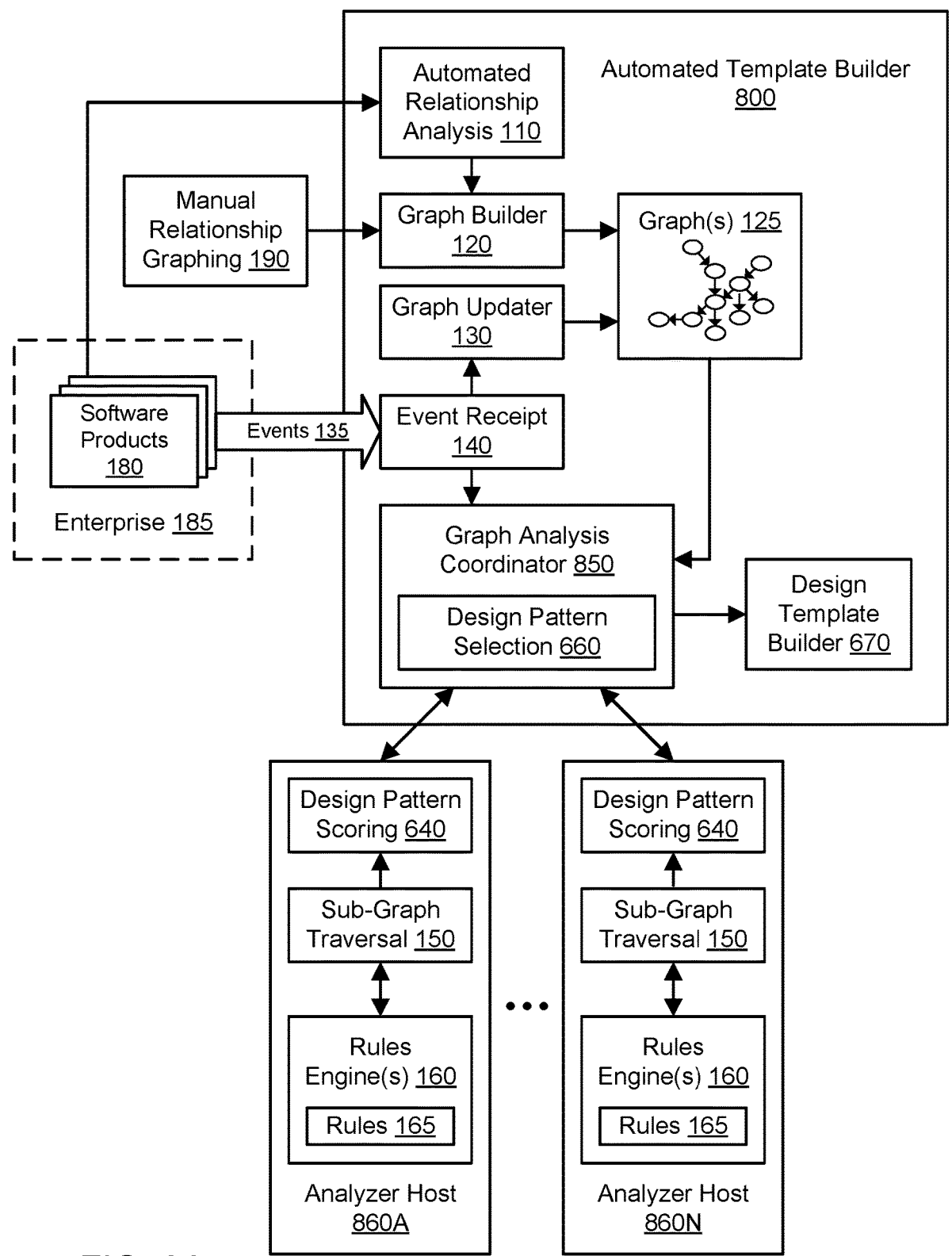
FIG. 8A illustrates further aspects of the example system environment for automated selection of secure design patterns, including the use of a fleet of hosts to perform sub-graph traversal and pattern scoring using one or more rules engines, according to one embodiment.

FIG. 8A illustrates further aspects of the example system environment for automated selection of secure design patterns, including the use of a fleet of hosts to perform sub-graph traversal and pattern scoring using one or more rules engines, according to one embodiment. An automated template builder 800 may perform similar operations as the template builder 600 but may use a fleet of hosts 860A-860N for concurrent traversal and scoring of different sub-graphs. The fleet of analyzer hosts 860A-860N may implement sub-graph traversal 150 using the rules engine(s) 160 or analyzer(s) 161. Although analyzer hosts 860A through 860N are shown for purposes of illustration and example, it is contemplated that any suitable number and configuration of analyzer hosts may be used. In one embodiment, the various analyzer hosts 860A-860N may employ the same one or more rules engines 160 and the same rules 165 across the fleet of hosts. In one embodiment, the various analyzer hosts 860A-860N may employ different rules engines or rules across the fleet of hosts. In some embodiments, the analyzer hosts 860A-860N may employ analyzers 161 other than rules engines, e.g., to determine policy compliance of software products.

The template builder 800 may include a graph analysis coordinator 850 that coordinates the graph analysis of the analyzer hosts 860A-860N. In one embodiment, the graph analysis coordinator 850 may send commands to individual analyzer hosts in order to cause the individual hosts to perform sub-graph traversal and scoring for particular sub-graphs. In one embodiment, the graph analysis coordinator 850 may then receive results of the sub-graph traversal, such as scores, from the individual analyzer hosts. The graph analysis coordinator 850 may then employ the design pattern selector 660 using scores generated by the analyzer hosts 860A-860N working in parallel.

In one embodiment, the graph analysis coordinator 850 may select or modify the number of analyzer hosts 860A-860N to meet the current processing needs of the threat modeling process. For example, graph analysis coordinator 850 may scale up the number of analyzer hosts as more events are received or scale down the number of analyzer hosts as fewer events are received. As another example, the graph analysis coordinator 850 may scale up the number of analyzer hosts as host metrics exceed a performance or usage threshold or scale down the number of analyzer hosts as host usage metrics drop below a performance or usage threshold. In one embodiment, the graph analysis coordinator 850 may interact with a resource manager of a provider network in order to select, provision, configure, and/or deprovision hosts. For example, the resource manager may respond to a request from the graph analysis coordinator 850 by reserving a particular set of hosts from a pool of available hosts. Similarly, the resource manager may deprovision and return surplus hosts to the pool of available hosts, e.g., for use by other services.

Figure 8B:
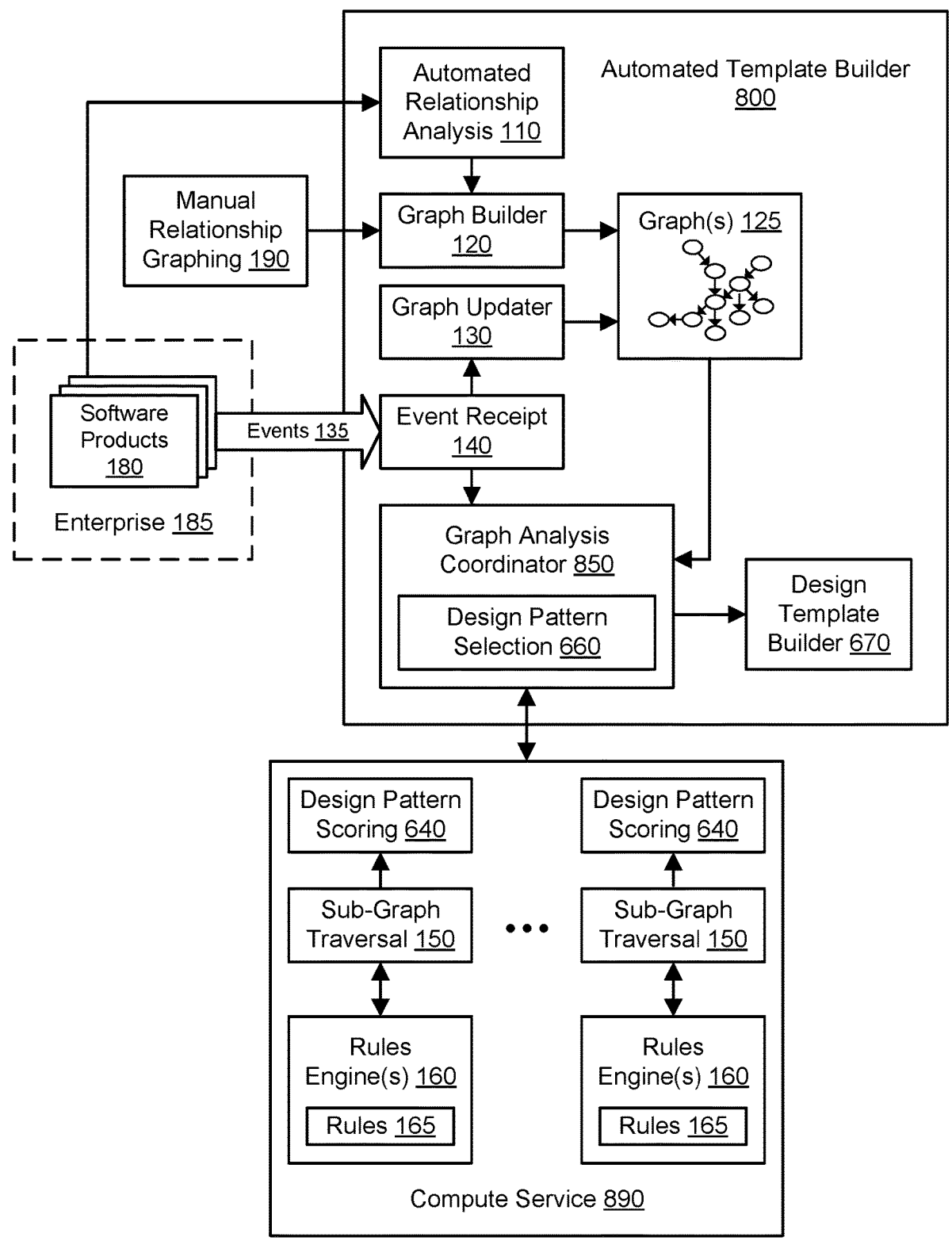
FIG. 8B illustrates further aspects of the example system environment for automated selection of secure design patterns, including the use of a serverless compute service to perform sub-graph traversal and pattern scoring, according to one embodiment.

FIG. 8B illustrates further aspects of the example system environment for automated selection of secure design patterns, including the use of a serverless compute service to perform sub-graph traversal and pattern scoring, according to one embodiment. As discussed above, the graph analysis coordinator 850 may distribute sub-graph traversal jobs to other entities. In one embodiment, as shown in FIG. 8B, the graph analysis coordinator 850 may distribute sub-graph traversal jobs to a compute service 890. The compute service 890 may represent a serverless compute service such as Amazon Lambda. The compute service 890 may accept requests to perform compute operations such as sub-graph traversal 150 and design pattern scoring 640, perform the requested operations using compute resources managed by the service 890, and respond with output (e.g., scores for design patterns) to the graph analysis coordinator 850. By assigning such operations to the compute service 890, the automated template builder 800 and graph analysis coordinator 850 may be freed of the responsibility of managing a fleet of analyzer hosts.

The automated template builders 600 and 800 and analyzer hosts 860A-860N may be implemented using any suitable number and configuration of computing devices, any of which may be implemented by the example computing device 3000 illustrated in FIG. 11. The computing devices may be located in any suitable number of data centers or geographical locations. In various embodiments, at least some of the functionality of the automated template builders 600 and 800 may be provided by the same computing device or by different computing devices. If any of the components of the automated template builders 600 and 800 are implemented using different computing devices, then the components and their respective computing devices may be communicatively coupled, e.g., via one or more networks. Each of the components of the automated template builders 600 and 800 may represent any combination of software and hardware usable to perform their respective functions, as discussed as follows. Operations implemented by the automated template builders 600 and 800 may be performed automatically, e.g., without a need for user initiation or user intervention after an initial configuration stage, and programmatically, e.g., by execution of program instructions on at least one computing device. It is contemplated that the automated template builders 600 and 800 and analyzer hosts 860A-860N may include additional components not shown, fewer components than shown, or different combinations, configurations, or quantities of the components shown.

The automated template builders 600 and 800 and analyzer hosts 860A-860N may be implemented in a service-oriented system in which multiple services collaborate according to a service-oriented architecture. In such an environment, the automated template builders 600 and 800 may offer their functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the automated template builders 600 and 800. To enable clients to invoke its functionality, the automated template builders 600 and 800 may expose any suitable interface(s), such as one or more APIs or other programmatic interfaces and/or graphical user interfaces (GUIs). In one embodiment, the functionality of the automated template builders 600 and 800 may be offered to clients in exchange for fees.

Components of the enterprise 185, such as ETL tools that provide information about software products and their relationships, may convey network-based service requests to the automated template builders 600 and 800 via one or more networks. In various embodiments, the network(s) may encompass any suitable combination of networking hardware and protocols necessary to establish network-based communications between the enterprise 185 and the automated template builders 600 and 800. For example, the network(s) may generally encompass the various telecommunications networks and service providers that collectively implement the Internet. The network(s) may also include private networks such as local area networks (LANs) or wide area networks (WANs) as well as public or private wireless networks. For example, both the software products 180 (and associated ETL tools) and the automated template builders 600 and 800 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the enterprise 185 and the Internet as well as between the Internet and the automated template builders 600 and 800. It is noted that in some embodiments, the enterprise 185 may communicate with the automated template builders 600 and 800 using a private network rather than the public Internet.

In one embodiment, aspects of the automated template builders 600 and 800 and analyzer hosts 860A-860N may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 9A:
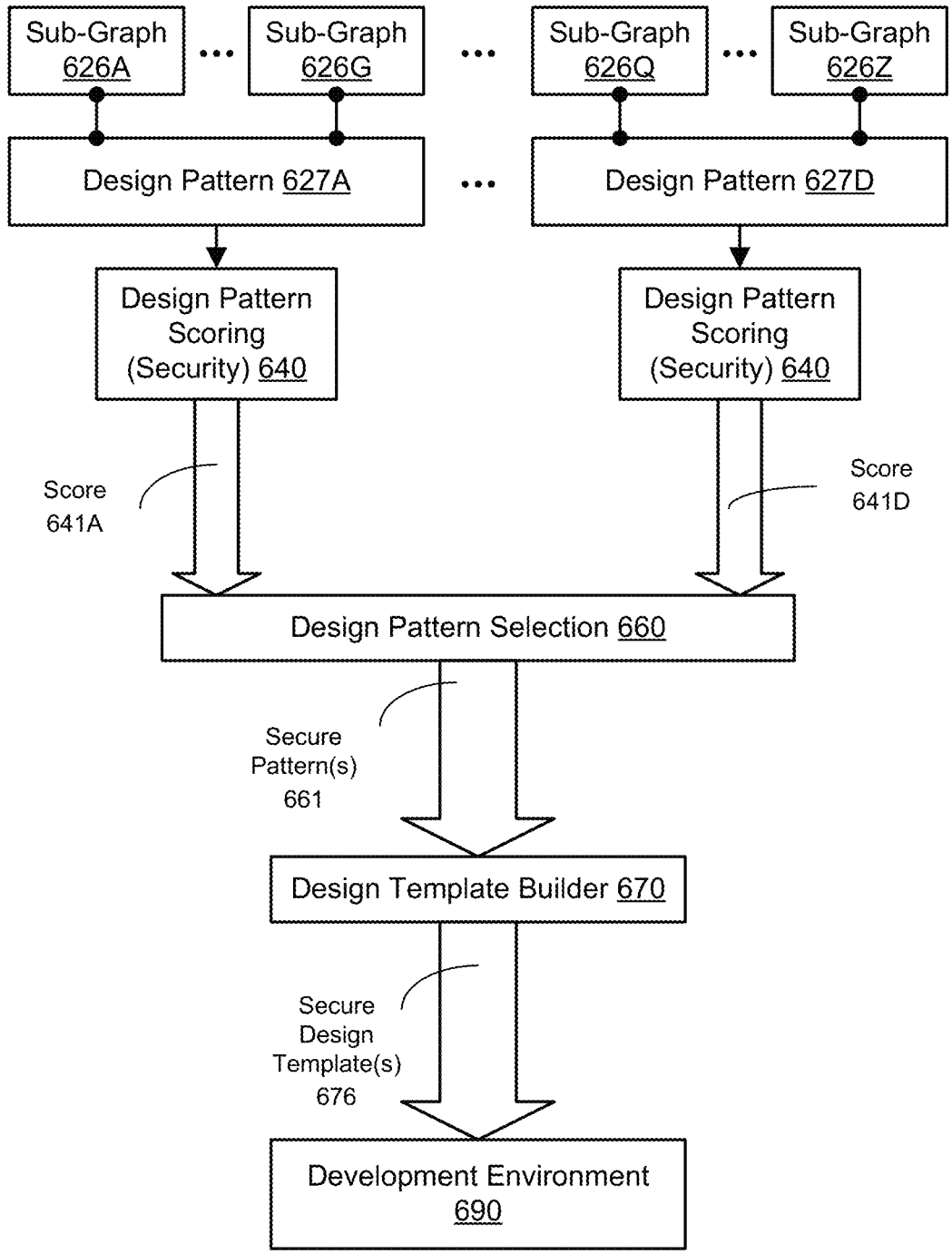
FIG. 9A illustrates further aspects of the example system environment for automated selection of secure design patterns, including the selection of a secure design pattern corresponding to multiple sub-graphs, according to one embodiment.

FIG. 9A illustrates further aspects of the example system environment for automated selection of secure design patterns, including the selection of a secure design pattern corresponding to multiple sub-graphs, according to one embodiment. In one embodiment, one or more sub-graphs may correspond to a particular design pattern. For example, as shown in FIG. 9A, sub-graphs 626A through 626G may share the common design pattern 627A. Similarly, sub-graphs 626Q through 626Z may share the common design pattern 627D. A design pattern common to multiple sub-graphs or applications may include the same or similar set of components that interact in the same or similar manner. In one embodiment, scores may be assigned to design patterns such as patterns 627A through 627D. The scores may indicate the relative security of the design patterns. For example, the design pattern scoring (for security) 640 may generate a particular score 641A for design pattern 627A, and the design pattern scoring (for security) 640 may also generate a particular score 641D for design pattern 627D. A score assigned by the component 640 may be generated based on the detection of any unmitigated security threats during the sub-graph traversal 150. Scores may be assigned on any suitable basis such that different design patterns may be ranked in their security. In one embodiment, a design pattern may be assigned a superior score if the design pattern is longer (e.g., in terms of the extent of the pattern's relationships between components). In one embodiment, a design pattern may be assigned a superior score if the design pattern has fewer unique unmitigated threats. In one embodiment, a design pattern may be assigned a superior score if the design pattern is found more frequently among the sub-graphs 626.

In one embodiment, the design patterns 627A through 627D may belong to the same category or sub-category, and the design pattern selection 660 may compare the scores to select a preferred or recommended design pattern for that category. As shown in FIG. 9A, the pattern selection 660 may output one or more of the patterns 627A-627D as secure design pattern(s) 661 in the relevant category. As discussed above, a design template builder 670 may construct or generate one or more secure design templates 676 based (at least in part) on the selected design pattern(s) 661. The secure design template(s) may be populated with data or metadata indicating the types of components and the inter-component relationships found in the selected sub-graphs or design pattern(s). For example, in the category of secure payment, a secure design template may indicate one or more secure storage services, one or more secure protocols for data transmission between components, and so on. When a developer seeks to build a new application in one of the categories of functionality, a secure design template for that category may be provided in a development environment 690. The relevant category may be determined automatically (e.g., based on analysis of components specified by the developer) or using input from the developer. The developer may add to the secure design template, but the automatically generated secure design template may initially improve the security of the new application and reduce security threats and vulnerabilities without additional work by the developer. In one embodiment, the scoring, pattern selection, and template building may be performed repeatedly over time to automatically keep the secure template(s) up-to-date with the latest security threats.

Figure 9B:
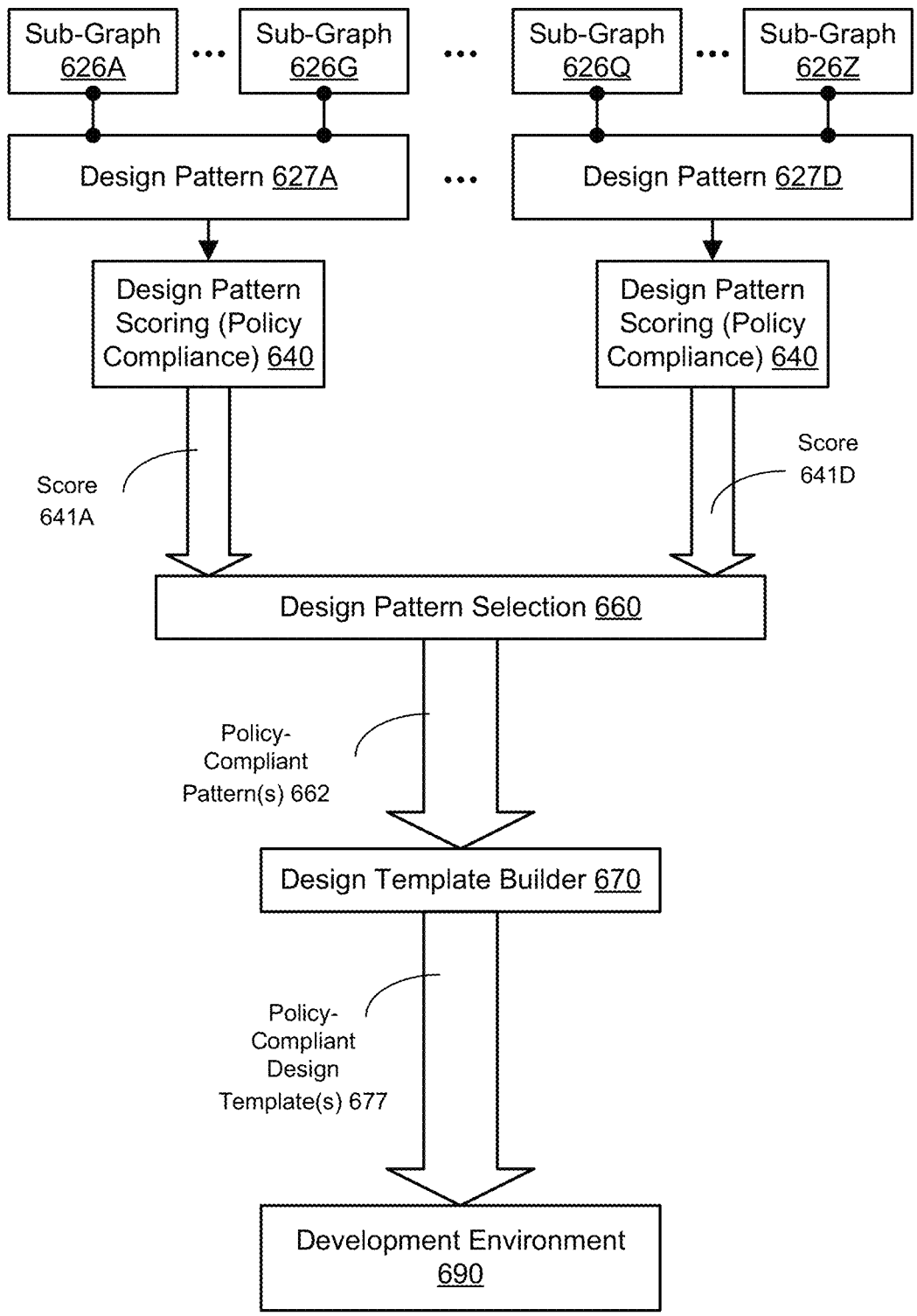
FIG. 9B illustrates further aspects of the example system environment for automated selection of secure design patterns, including the selection of a policy-compliant design pattern corresponding to multiple sub-graphs, according to one embodiment.

FIG. 9B illustrates further aspects of the example system environment for automated selection of secure design patterns, including the selection of a policy-compliant design pattern corresponding to multiple sub-graphs, according to one embodiment. In one embodiment, one or more sub-graphs may correspond to a particular design pattern. For example, as shown in FIG. 9B, sub-graphs 626A through 626G may share the common design pattern 627A. Similarly, sub-graphs 626Q through 626Z may share the common design pattern 627D. A design pattern common to multiple sub-graphs or applications may include the same or similar set of components that interact in the same or similar manner. In one embodiment, scores may be assigned to design patterns such as patterns 627A through 627D. The scores may indicate the policy compliance of the design patterns. For example, the design pattern scoring (for policy compliance) 640 may generate a particular score 641A for design pattern 627A, and the design pattern scoring (for policy compliance) 640 may also generate a particular score 641D for design pattern 627D. A score assigned by the component 640 may be generated based on the detection of policy compliance or noncompliance during the sub-graph traversal 150. For example, applicable policies may require the use of particular pre-approved components for operations involving sensitive data. Scores may be assigned on any suitable basis such that different design patterns may be ranked in their policy compliance. In one embodiment, a design pattern may be assigned a superior score if the design pattern is longer (e.g., in terms of the extent of the pattern's relationships between components). In one embodiment, a design pattern may be assigned a superior score if the design pattern has fewer unique unmet policies. In one embodiment, a design pattern may be assigned a superior score if the design pattern is found more frequently among the sub-graphs 626.

In one embodiment, the design patterns 627A through 627D may belong to the same category or sub-category, and the design pattern selection 660 may compare the scores to select a preferred or recommended design pattern for that category. As shown in FIG. 9A, the pattern selection 660 may output one or more of the patterns 627A-627D as policy-compliant design pattern(s) 662 in the relevant category. As discussed above, a design template builder 670 may construct or generate one or more policy-compliant design templates 677 based (at least in part) on the selected design pattern(s) 662. The policy-compliant design template(s) may be populated with data or metadata indicating the types of components and the inter-component relationships found in the selected sub-graphs or design pattern(s). For example, in the category of secure payment, a policy-compliant design template may indicate one or more approved storage services, one or more approved protocols for data transmission between components, and so on. When a developer seeks to build a new application in one of the categories of functionality, a policy-compliant design template for that category may be provided in a development environment 690. The relevant category may be determined automatically (e.g., based on analysis of components specified by the developer) or using input from the developer. The developer may add to the policy-compliant design template, but the automatically generated policy-compliant design template may initially improve the policy compliance of the new application without additional work by the developer. In one embodiment, the scoring, pattern selection, and template building may be performed repeatedly over time to automatically keep the policy-compliant template(s) up-to-date with the latest policies.

Figure 10:
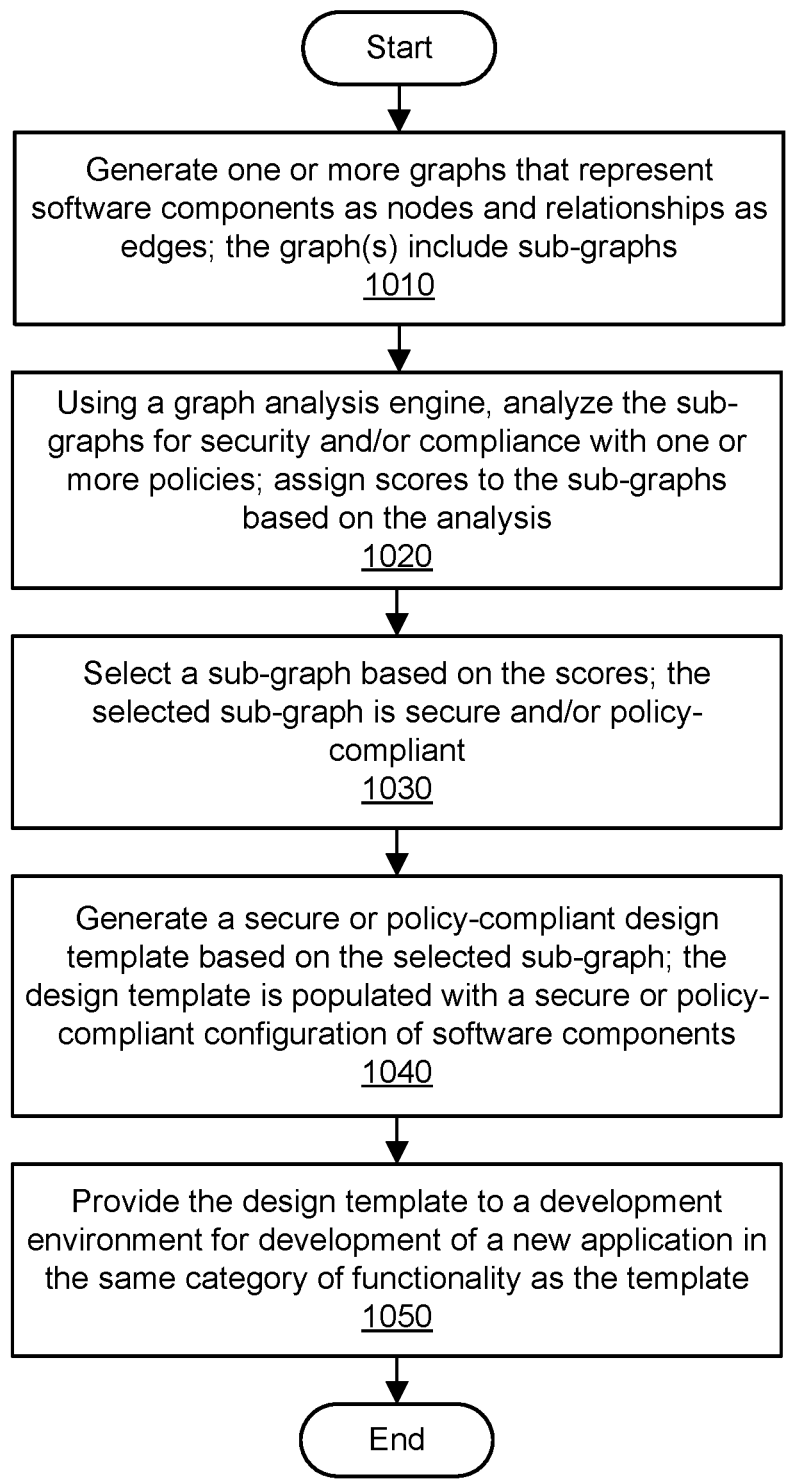
FIG. 10 is a flowchart illustrating a method for automated selection of secure design patterns, according to one embodiment.

FIG. 10 is a flowchart illustrating a method for automated selection of secure design patterns, according to one embodiment. As shown in 1010, one or more graphs may be generated that represent software components as nodes and relationships between the components as edges. The graph(s) may be built using user input and/or automated analysis of the corresponding applications and services. The graph(s) may include sub-graphs that represent particular types of functionality. For example, if one entire graph represents a particular application related to an online merchant, then a particular sub-graph of that graph may represent the application's use of a secure storage service to store sensitive payment information such as credit card numbers. This sub-graph may be categorized in one or more categories related to payments or sensitive data handling. Multiple sub-graphs may share a common design pattern.

As shown in 1020, at least some of the sub-graphs may be analyzed using a graph analysis engine. The graph analysis engine may traverse each sub-graph and use one or more rules engine or analyzers to assess the security and/or policy compliance of different sub-graphs. The graph analysis engine may assign a score to each of the analyzed sub-graphs or the corresponding design patterns. The scores may reflect the relative security and/or policy compliance of the sub-graphs or design patterns.

As shown in 1030, at least one sub-graph or corresponding design pattern may be selected based on the scores. In one embodiment, the sub-graph or corresponding design pattern with the lowest (most secure) score may be selected. In one embodiment, sub-graphs or corresponding design patterns may be assigned to categories of functionality, and sub-graphs or design patterns may be selected within the particular categories of functionality by examining the scores of the graphs or design patterns within particular categories.

As shown in 1040, a secure or policy-compliant design template may be generated based (at least in part) on a selected sub-graph or design pattern. The design template may be populated with indications of secure or policy-compliant software components and secure or policy-compliant configurations thereof. For example, the design template may indicate an approved and/or secure storage service suitable for storing sensitive data. As another example, the design template may indicate an approved and/or secure configuration for accessing the storage service. As shown in 1050, the secure design template may be provided to a development environment. When a developer seeks to build a new application, the development environment may present a secure or policy-compliant design template selected for the same category of functionality as the new application. In this manner, the initial security and/or policy compliance of the new application may be enhanced without the need for manual confirmation of security and/or policy compliance by the developer.

Illustrative Computer System

In at least some embodiments, a computer system that implements a portion or all of one or more of the technologies described herein may include a computer system that includes or is configured to access one or more computer-readable media. FIG. 11 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 11 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and a memory to store computer-executable instructions that, if executed, cause the one or more processors to:
   determine one or more graphs comprising a plurality of nodes and a plurality of edges, wherein at least a portion of the nodes represent first software components and at least a portion of the edges represent relationships between the first software components, and wherein the one or more graphs comprise a plurality of sub-graphs;
   categorize at least a portion of the sub-graphs into a plurality of predefined categories of software component functionality, wherein the predefined categories of software component functionality are predefined in the system, and wherein a particular sub-graph of the one or more graphs is categorized in a particular category of the plurality of predefined categories of software component functionality;
   perform, by a graph analysis engine, an analysis of the sub-graphs to detect security vulnerabilities, wherein the sub-graphs represent design patterns, and wherein the design patterns are assigned respective security scores indicating relative security based at least in part on the analysis;
   select a particular design pattern associated with the particular sub-graph of the one or more graphs in the particular category of software component functionality, wherein said select is based at least in part on the respective security scores of design patterns in the particular category of software component functionality;

generate a secure design template to be provided in a development environment in which a new software component is to be built using the secure design template, wherein said generate is based on at least one of the first software components in the particular design pattern and the secure design template comprises indications of one or more policy-compliant software components or one or more policy-compliant configurations; and provide the secure design template in the development environment for building, using the secure design template, the new software component associated with the particular category of software component functionality, wherein said select the particular design pattern in the particular category of software component functionality, based at least in part on the respective security scores, causes the secure design template that is provided to the development environment for the new software component to comprise a configuration that reduces security vulnerabilities compared to use of other design patterns in the particular software component category of functionality.

2. The system as recited in claim 1, wherein the computer-executable instructions, if executed, cause the one or more processors to:

generate a secure code template based at least in part on the secure design template, wherein the secure code template comprises program code; and provide the secure code template in the development environment for building the new software component.

3. The system as recited in claim 1, wherein the computer-executable instructions, if executed, cause the one or more processors to:

generate one or more updated graphs based at least in part on changes to the first software components in the one or more graphs;

perform an updated analysis, by the graph analysis engine, of a plurality of sub-graphs of the one or more updated graphs for security vulnerabilities; and generate an updated secure design template based at least in part on the updated analysis.

4. The system as recited in claim 1, wherein the graph analysis engine performs threat modeling on the sub-graphs using a rules engine, wherein the rules engine applies one or more rules to metadata associated with nodes and edges of the sub-graphs, and wherein the threat modeling determines whether one or more security vulnerabilities are present in the sub-graphs based at least in part on application of the one or more rules.

5. A method, comprising:

determining one or more graphs comprising a plurality of nodes and a plurality of edges, wherein at least a portion of the nodes represent first software components and at least a portion of the edges represent relationships between the first software components, and wherein the one or more graphs comprise a plurality of sub-graphs;

analyzing, by a graph analysis engine, the sub-graphs for compliance with one or more security policies;

selecting a particular sub-graph based at least in part on a respective security policy compliance of the sub-graphs;

determining a secure design template, to be provided in a development environment in which another software component is to be built using the secure design template, wherein said determining is based at least in part on one or more of the first software components in the particular sub-graph and the secure design template comprises indications of one or more policy-compliant software components or one or more policy-compliant configurations; and providing the secure design template in the development environment for building, using the secure design template, the other software component in the development environment, wherein said selecting the particular sub-graph, based on the respective policy compliance, causes the provided secure design template to comprise a configuration compliant with the one or more policies.

6. The method as recited in claim 5, further comprising:

determining a code template based at least in part on the design template, wherein the code template comprises program code compliant with the one or more policies; and providing the code template in the development environment.

7. The method as recited in claim 5, further comprising:

determining one or more updated graphs based at least in part on changes to the first software components in the one or more graphs;

performing an updated analysis, by the graph analysis engine, of a plurality of sub-graphs of the one or more updated graphs for compliance with the one or more policies; and determining an updated design template based at least in part on the updated analysis.

8. The method as recited in claim 5, further comprising:

categorizing at least a portion of the sub-graphs into a plurality of categories of software component functionality, wherein the particular sub-graph is categorized in a particular category of software component functionality, and wherein the design template is associated with the particular category of software component functionality.

9. The method as recited in claim 8, wherein the categorizing for the particular sub-graph is performed using ownership metadata associated with the particular sub-graph, wherein the ownership metadata identifies a division within an organization.

10. The method as recited in claim 5, wherein the one or more policies comprise one or more security policies, and wherein the design template reduces security vulnerabilities.

11. The method as recited in claim 5, wherein the particular sub-graph is selected based on a larger size of the particular sub-graph in comparison to others of the sub-graphs.

12. The method as recited in claim 5, wherein the particular sub-graph is selected based on a smaller number of unmitigated security vulnerabilities of the particular sub-graph in comparison to others of the sub-graphs.

13. The method as recited in claim 5, wherein the particular sub-graph represents a design pattern, and wherein the particular sub-graph is selected based on a higher frequency of the design pattern among the sub-graphs in comparison to other design patterns.

14. The method as recited in claim 5, wherein the graph analysis engine performs threat modeling on the sub-graphs using a rules engine, wherein the rules engine applies one or more rules to metadata associated with nodes and edges of the sub-graphs, and wherein the threat modeling determines whether one or more security vulnerabilities are present in the sub-graphs based at least in part on application of the one or more rules.

15. The method as recited in claim 5, wherein the sub-graphs represent design patterns, wherein the design patterns are assigned respective scores based at least in part on the analysis, and wherein the particular sub-graph is selected based at least in part on the respective scores.

16. The method as recited in claim 15, wherein the design patterns are assigned the respective scores based at least in part on one or more performance metrics.

17. One or more non-transitory computer-readable storage media storing program instructions that, when executed on or across one or more processors, perform:

determining one or more graphs comprising a plurality of nodes and a plurality of edges, wherein at least a portion of the nodes represent first software components and at least a portion of the edges represent relationships between the first software components, and wherein the one or more graphs comprise a plurality of sub-graphs;

performing, by a graph analysis engine, an analysis of the sub-graphs representative of one or more of the first software components for compliance with one or more security policies, wherein the sub-graphs represent design patterns, and wherein the design patterns are assigned respective security scores indicating relative security based at least in part on the analysis;

selecting a particular sub-graph based at least in part on a security score associated with the particular sub-graph;

generating a design template to be provided in a development environment in which another software component is to be built using the design template, wherein said generating is based on at least one of the first software components in the particular sub-graph and the design template comprises indications of one or more policy-compliant software components or one or more policy-compliant configurations; and providing the design template in the development environment for building, using the design template, the other software component in the development environment, wherein said selecting the particular sub-graph based at least in part on the security score causes the design template that is provided in the development environment to comprise a configuration compliant with the one or more security policies.

18. The one or more non-transitory computer-readable storage media as recited in claim 17, wherein the program instructions, when executed on or across the one or more processors, perform:

generating a code template based at least in part on the design template, wherein the code template comprises program code compliant with the one or more security policies; and providing the code template in the development environment.

19. The one or more non-transitory computer-readable storage media as recited in claim 17, wherein the program instructions, when executed on or across the one or more processors, perform:

generating one or more updated graphs based at least in part on changes to the first software components in the one or more graphs;

performing an updated analysis, by the graph analysis engine, of a plurality of sub-graphs of the one or more updated graphs for compliance with the one or more security policies; and generating an updated design template based at least in part on the updated analysis.

20. The one or more non-transitory computer-readable storage media as recited in claim 17, wherein the particular sub-graph represents a design pattern, and wherein the particular sub-graph is selected based on a higher frequency of the design pattern among the sub-graphs in comparison to other design patterns.

* * * * *